(12) United States Patent
Zakowski et al.

(10) Patent No.: US 11,503,938 B2
(45) Date of Patent: Nov. 22, 2022

(54) COOKING APPLIANCE WITH A FAN MOTOR HAVING A DRIVE SHAFT AND DRIVE HUB

(71) Applicant: Conair Corporation, Stamford, CT (US)

(72) Inventors: Joseph W. Zakowski, Avon, CT (US); James Andrew Sandor, Trumbull, CT (US); Inna Doliner, Wilton, CT (US); Tara Lorraine Moseley Dunn, Norwalk, CT (US); Scott A. Leclerc, Ashby, MA (US); Bryan R. Hotaling, Harvard, MA (US); James R. Varney, Bolton, MA (US)

(73) Assignee: CONAIR CORPORATION, Stamford, CT (US)

(*) Notice: Subject to any disclaimer, the term of this patent is extended or adjusted under 35 U.S.C. 154(b) by 190 days.

(21) Appl. No.: 16/678,404

(22) Filed: Nov. 8, 2019

(65) Prior Publication Data

US 2021/0137298 A1 May 13, 2021

(51) Int. Cl.
| | |
|---|---|
| A47J 27/00 | (2006.01) |
| A47J 36/06 | (2006.01) |
| A47J 36/16 | (2006.01) |
| A47J 27/092 | (2006.01) |
| A47J 36/32 | (2006.01) |
| A47J 27/086 | (2006.01) |
| A47J 37/06 | (2006.01) |

(52) U.S. Cl.
CPC .......... *A47J 27/004* (2013.01); *A47J 27/086* (2013.01); *A47J 27/092* (2013.01); *A47J 36/06* (2013.01); *A47J 36/16* (2013.01); *A47J 36/32* (2013.01); *A47J 37/0641* (2013.01)

(58) Field of Classification Search
CPC ........ A47J 27/004; A47J 27/09; A47J 27/092; A47J 27/086; A47J 37/0641; A47J 36/06; A47J 36/10; A47J 36/16
See application file for complete search history.

(56) References Cited

U.S. PATENT DOCUMENTS

| | | | |
|---|---|---|---|
| 5,590,583 A | 1/1997 | Harrison | |
| 6,135,012 A * | 10/2000 | Kao | ..................... A47J 27/0802 |
| | | | 219/453.11 |
| 10,390,656 B2 | 8/2019 | Gill et al. | |
| 2011/0095015 A1* | 4/2011 | Kao | ..................... A47J 27/086 |
| | | | 219/433 |
| 2011/0147365 A1 | 6/2011 | Pellerin et al. | |
| 2017/0127871 A1* | 5/2017 | Leung | ..................... A47J 27/04 |

(Continued)

FOREIGN PATENT DOCUMENTS

WO 2017085673 A1 5/2017

OTHER PUBLICATIONS

International Search Report of corresponding PCT Application No. PCT/US2020/059457 dated Jan. 6, 2021.

*Primary Examiner* — John J Norton
(74) *Attorney, Agent, or Firm* — McCormick, Paulding & Huber PLLC

(57) ABSTRACT

A cooking appliance includes a base including an upper surface having a cooktop, and a lid separable from the base, and including a heater assembly disposed therein. The cooking appliance further includes a control unit configured to operate at least one of the cooktop in the base or the heater assembly in the lid.

17 Claims, 21 Drawing Sheets

(56) References Cited

U.S. PATENT DOCUMENTS

| | | |
|---|---|---|
| 2018/0325313 A1 | 11/2018 | De'Longhi et al. |
| 2019/0045973 A1 | 2/2019 | Gill et al. |
| 2019/0231125 A1 | 8/2019 | Gill et al. |
| 2019/0231126 A1 | 8/2019 | Gill et al. |
| 2019/0231127 A1 | 8/2019 | Gill et al. |
| 2019/0231128 A1 | 8/2019 | Gill et al. |
| 2019/0231129 A1 | 8/2019 | Gill et al. |
| 2019/0231130 A1 | 8/2019 | Gill et al. |
| 2019/0231131 A1 | 8/2019 | Gill et al. |
| 2019/0231132 A1 | 8/2019 | Gill et al. |
| 2019/0231133 A1 | 8/2019 | Gill et al. |
| 2019/0231134 A1 | 8/2019 | Gill et al. |
| 2019/0231135 A1 | 8/2019 | Gill et al. |
| 2019/0231136 A1 | 8/2019 | Gill et al. |
| 2019/0231137 A1 | 8/2019 | Gill et al. |
| 2019/0231138 A1 | 8/2019 | Gill et al. |
| 2019/0231139 A1 | 8/2019 | Gill et al. |
| 2019/0231140 A1 | 8/2019 | Gill et al. |
| 2019/0231141 A1 | 8/2019 | Gill et al. |
| 2019/0231142 A1 | 8/2019 | Gill et al. |
| 2019/0231143 A1 | 8/2019 | Gill et al. |
| 2020/0205596 A1 | 7/2020 | Chen |

\* cited by examiner

COOKING APPLIANCE WITH A FAN MOTOR HAVING A DRIVE SHAFT AND DRIVE HUB

TECHNICAL FIELD

This present disclosure relates to cooking appliances and methods for cooking food.

BACKGROUND

Various countertop appliances exist for heating and cooking a variety of food items. For example, toaster ovens use electrically powered heat elements to emit heat within an enclosed volume to heat food placed therein. Microwave ovens use microwaves to heat food on a molecular level. Each type of cooking appliance has advantages and disadvantages, depending on the type of food being cooked and the objectives of the user. While different types of known cooking appliances are generally suitable for what is regarded as its ordinary performance, there is room for improvement in terms of ease of use, performance, and overall functionality.

SUMMARY

According to the present disclosure, a cooking appliance is disclosed that overcomes the shortcomings of the cooking appliances mentioned above. The cooking appliance comprises a base including an upper surface having a cooktop, a lid separable from the base, and a cooking pot that is separable from the base and the lid. The cooking pot is configured to sit on the cooktop of the base and to interface with the lid at an upper end. The lid includes a heater assembly disposed therein. The cooking appliance further includes a control unit configured to selectively operate the cooktop in the base or the heater assembly in the lid.

According to the present disclosure, the lid may include a locking system that secures the lid to the upper end of the cooking pot in a locked position. The locking system may comprise a plurality of engagement hooks extending downward from the lid and an actuator configured to move the plurality of engagement hooks into and out of engagement with the cooking pot. According to the present disclosure, the cooking appliance may further comprise a safety lock assembly that prevents the lid from being removed from the cooking pot during operation of the cooking appliance in a pressure cooker mode by preventing the engagement hooks from disengaging the cooking pot.

According to the present disclosure, the lid may comprise a vent hole extending between an interior of the lid and an exterior of the lid and a vent sealing member configured to close the vent hole when moved to an actuated position and to open the vent hole when moved to an unactuated position.

According to the present disclosure, the lid may comprise a vent hole or a plurality of vent holes extending between an interior of the lid and an exterior of the lid, a vent sealing member configured to close the vent hole when activated and to open the vent hole when deactivated, and a locking system configured to secure the lid to the upper end of the cooking pot when activated and to release the lid from the upper end of the cooking pot when deactivated. The lid may further comprise an actuator configured to simultaneously activate or deactivate the vent sealing member and the locking system.

According to the present disclosure, the control unit may comprise a plurality of different cooking modes controlling operation of the cooktop and a fan and heater coil of the heater assembly. The plurality of different cooking modes may include a pressure cooker mode and the lid may include a pressure release valve configured to control pressure within the cooking pot during operation in the pressure cooking mode.

According to the present disclosure, the cooktop may be an induction cooktop that provides conductive heating to the hollow interior of a cooking vessel, or it may be a direct heat cooktop that uses tubular heaters directly beneath, or embedded within, a plate that forms the cooking surface on which a cooking pot, skillet or other suitable vessel is placed.

The heater assembly may include a fan and heater coil that provides convective heating to the hollow interior. In an alternative embodiment, the heater assembly including the fan may be removably mounted for removal by a user for cleaning, repair or replacement.

According to the present disclosure, a magnetic drive assembly is provided to transfer torque and rotational motion from a magnetic drive hub to a magnetically conductive driven hub positioned opposite the drive hub on the other side of a solid wall that forms the bottom of the lid.

According to the present disclosure, a cooking appliance comprises a base including an upper surface having a cooktop, and a lid separable from the base. The lid includes a heater assembly disposed therein. The cooking appliance further comprises a cooking pot that is separable from the base and the lid and is configured to sit on the cooktop of the base and to interface with the lid at an upper end of the cooking pot. A control unit is configured to operate the cooking appliance in a plurality of different cooking modes by controlling at least one of the cooktop in the base or the heater assembly in the lid.

According to the present disclosure, the plurality of different cooking modes may include a pressure cooker mode in which the cooking pot is disposed on the base, the lid is secured to the cooking pot, and the control unit operates only the cooktop in the base. The cooktop may be an induction cooktop configured to provide convective heating to an interior of the cooking pot.

According to the present disclosure, the heater assembly disposed in the lid may include a fan and a heating coil. The plurality of different cooking modes may include a broiling and browning mode in which the cooking pot is disposed on the base, the lid is secured to the cooking pot, and the control unit operates only the heating coil of the heater assembly disposed in the lid. According to the present disclosure, the cooking appliance may also comprise a cooking basket configured to be disposed within the cooking pot. The plurality of different cooking modes may include an air fryer mode in which the cooking basket is disposed within the cooking pot, the cooking pot is disposed on the base, the lid is secured to the cooking pot, and the control unit operates both the fan and the heating coil of the heater assembly disposed in the lid.

According to the present disclosure, the base may include a lid support post having a lid locating feature at an upper end thereof. An underside of the lid may include a complimentary lid locating feature configured to engage the lid locating feature on the support post to properly align the lid with the base.

According to the present disclosure cooking appliance comprises a lid including a fan and a heating coil disposed therein, and a base, separable from the lid, the base including an upper surface having a cooktop and a lid support post configured to interface with the lid at an upper end thereof. The cooking appliance further comprises a cooking pot that is separable from the base and the lid. The cooking pot is configured to sit on the cooktop of the base and to interface with the lid at an upper end of the cooking pot. A removable cooking basket is configured to be disposed within the cooking pot. The cooking appliance further comprises a control unit configured to operate the cooking appliance in a plurality of different cooking modes by controlling at least one of the cooktop in the base, the fan in the lid, or the heating coil in the lid depending upon an assembled configuration including at least one of the lid, the base, the cooking pot, or the removable cooking basket.

These and other objects, features and advantages of the present disclosure will become apparent in light of the detailed description of embodiments thereof, as illustrated in the accompanying drawings.

DETAILED DESCRIPTION

Before the various embodiments are described in further detail, it is to be understood that the invention is not limited to the particular embodiments described. It will be understood by one of ordinary skill in the art that the cooking appliance described herein may be adapted and modified as is appropriate for the application being addressed and that the components of the cooking appliance described herein may be employed in other suitable applications, and that such other additions and modifications will not depart from the scope thereof.

Figure 1:
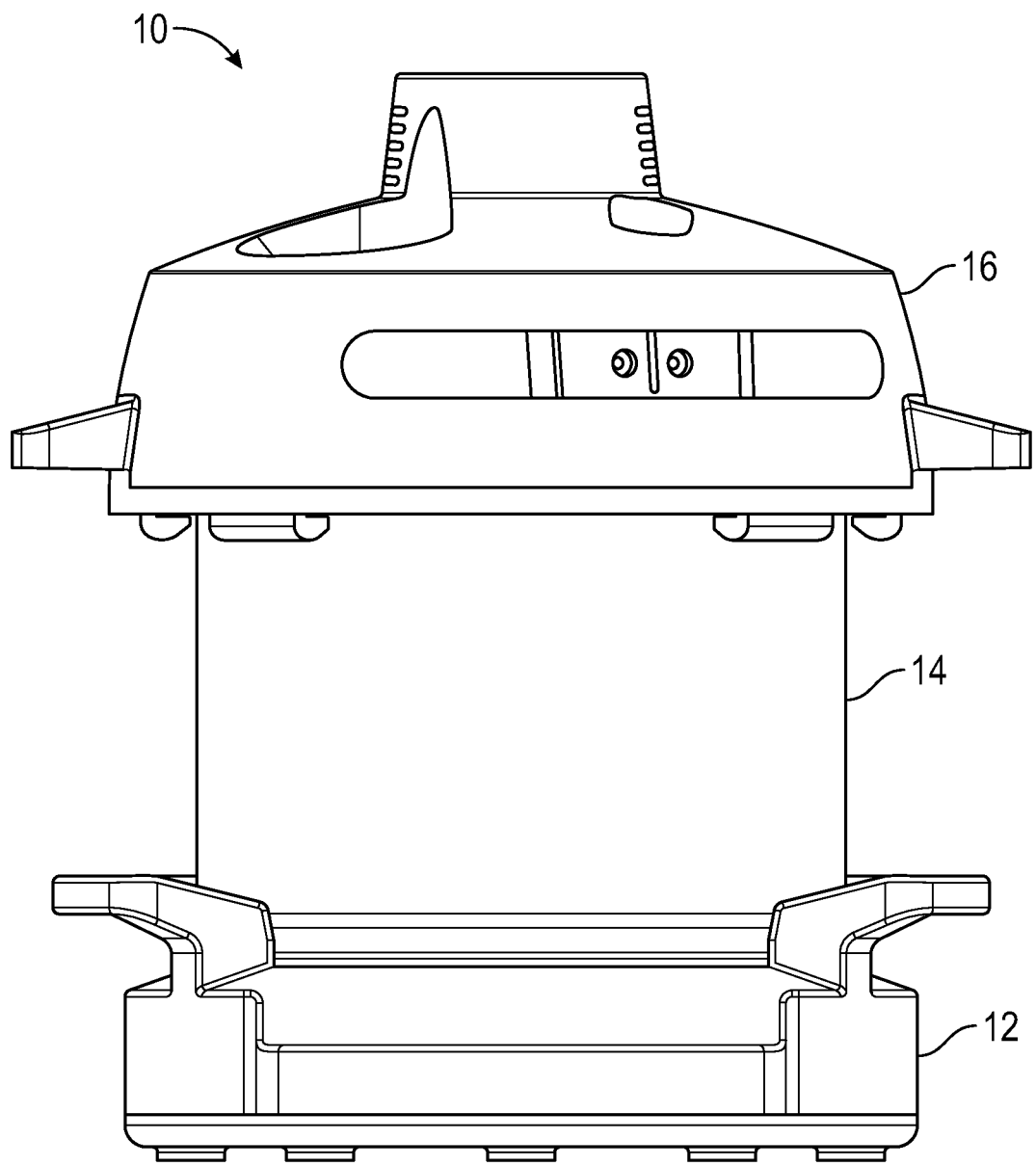
FIG. 1 is a front view of a cooking appliance according to the present disclosure.
Figure 2:
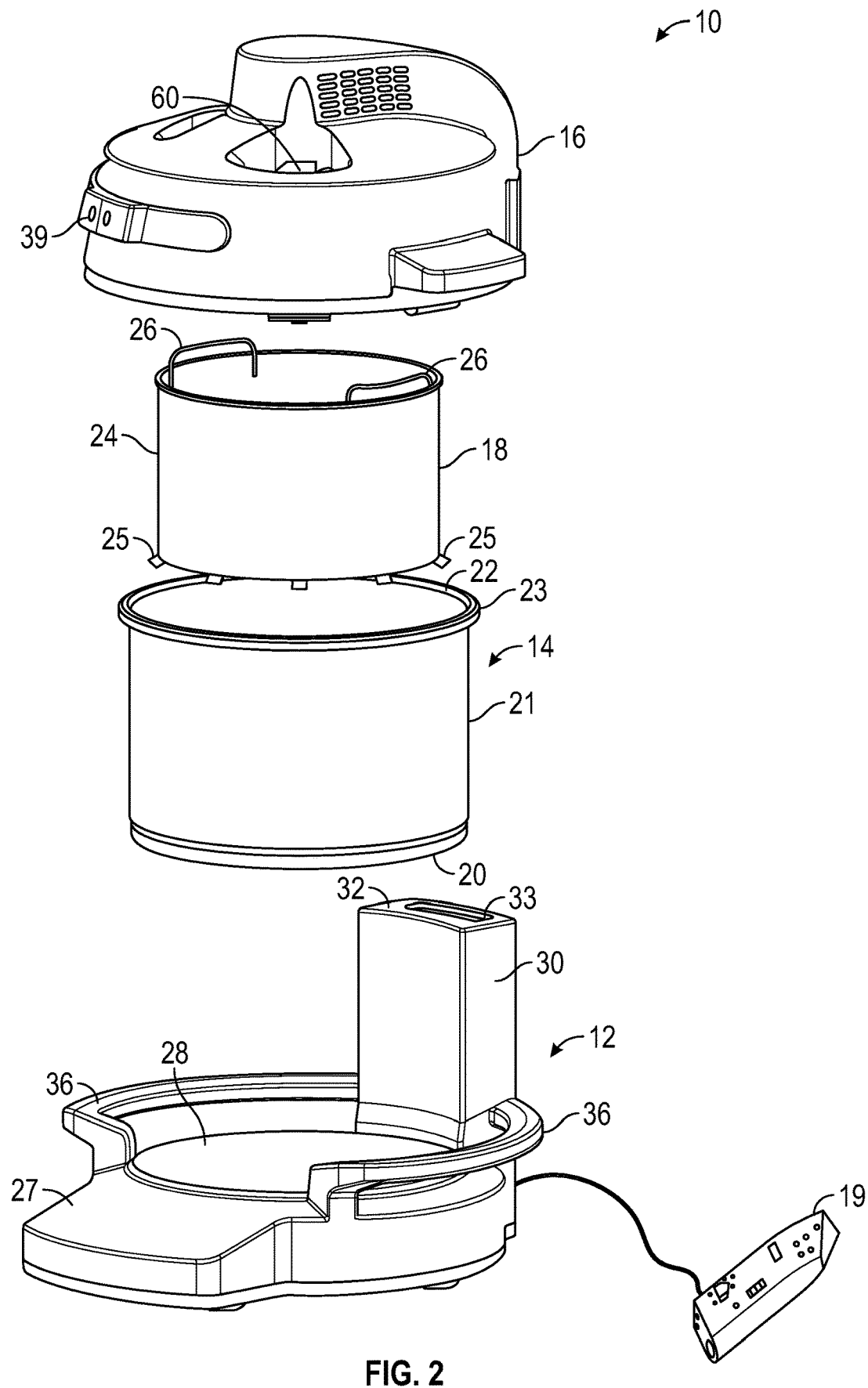
FIG. 2 is a front, top, right-hand side exploded perspective view of the cooking appliance of FIG. 1.

Referring to FIGS. 1-2, a cooking appliance 10 according to the present disclosure is shown. The cooking appliance 10 is a combination cooking appliance that may be configured to cook food items according to a variety of different cooking methods as discussed in greater detail below. For instance, the cooking appliance 10 may be configured as at least a pressure cooker, an air fryer (i.e., convection oven), a sauté cooktop, a broiler, or a browning oven as will be discussed in greater detail below. The cooking appliance 10 includes a base 12, a generally cylindrical cook pot 14, a lid 16, a cooking basket 18, shown in FIG. 2, and a control unit 19, also shown in FIG. 2.

Referring to FIG. 2, the cooking pot 14 includes a flat bottom 20, a generally cylindrical sidewall 21, an open upper end 22, and a flange 23 extending radially outward from the cylindrical sidewall 21 at the upper end 22. The open upper end 22 provides access to an interior of the cooking pot 14 to allow the interior of the cooking pot 14 to be filled with food items, to provide access for cleaning purposes, and/or the like. The cooking basket 18 is configured to be positioned inside the interior of the cooking pot 14 during some cooking modes as will be discussed below. The cooking basket 18 includes a container portion 24 configured to receive food items and a plurality of legs 25 configured to support the container portion 24 above the bottom 20 of the cooking pot 14. The cooking basket 18 may also include handles 26 to facilitate insertion of the cooking basket 18 into the interior of the cooking pot 14 and/or removal of the cooking basket 18 from the interior of the cooking pot 14.

Figure 3:
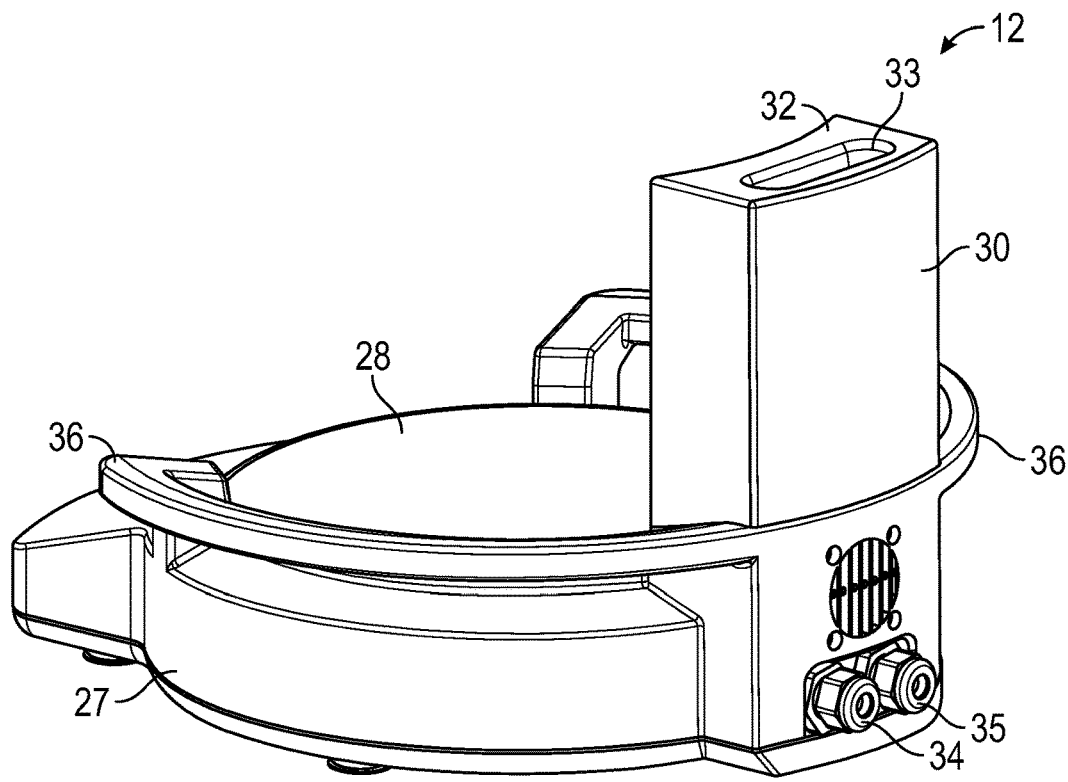
FIG. 3 is a rear, top, right-hand side perspective view of a base of the appliance of FIG. 1.
Figure 33:
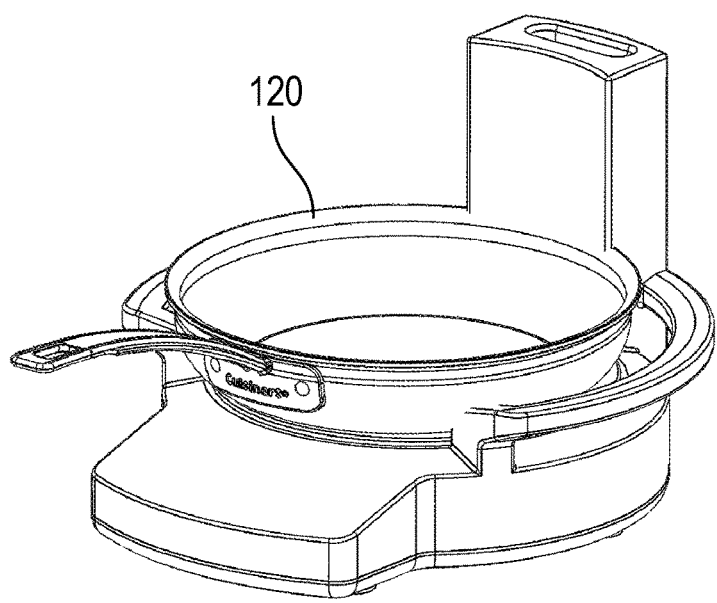
FIG. 33 is a front, top, right-hand side perspective view of the base of the appliance of FIG. 1 with a skillet positioned thereon.

Referring to FIGS. 2 and 3, the base 12 includes a body 27 positionable on a surface, such as a kitchen counter, a table, or the like. The body 27 includes a generally flat upper surface that includes a cooktop 28 configured to receive the cooking pot 14 thereon. The cooktop 28 includes an induction heating element, a tubular heating element, such as a CALROD heater, or any other similar known heating element capable of providing heat to the cooking pot 14 or any other cooking pot or pan positioned on the cooktop 28. For example, as shown in FIG. 33, a skillet 120 may be positioned on and heated by the cooktop 28. The base 12 includes a lid support post 30 integrally formed with the body 27 at one side thereof and extending upward to an upper end 32. The upper end 32 includes a lid locating feature 33 formed therein. The base 12 may include a power input port 34 and a control input port 35 configured to be connected to power and control cables, respectively, for providing electrical power and heating control to the cooktop 28. The base 12 may also include one or more guardrails 36 extending around at least a portion of the periphery of the cooktop 28. The one or more guardrails 36 serve to prevent the cooking pot 14 or any other cooking pot or pan positioned on the cooktop 28 from accidentally being pushed off of the cooktop 28 and may also act as a handle for carrying the base 12.

Figure 4:
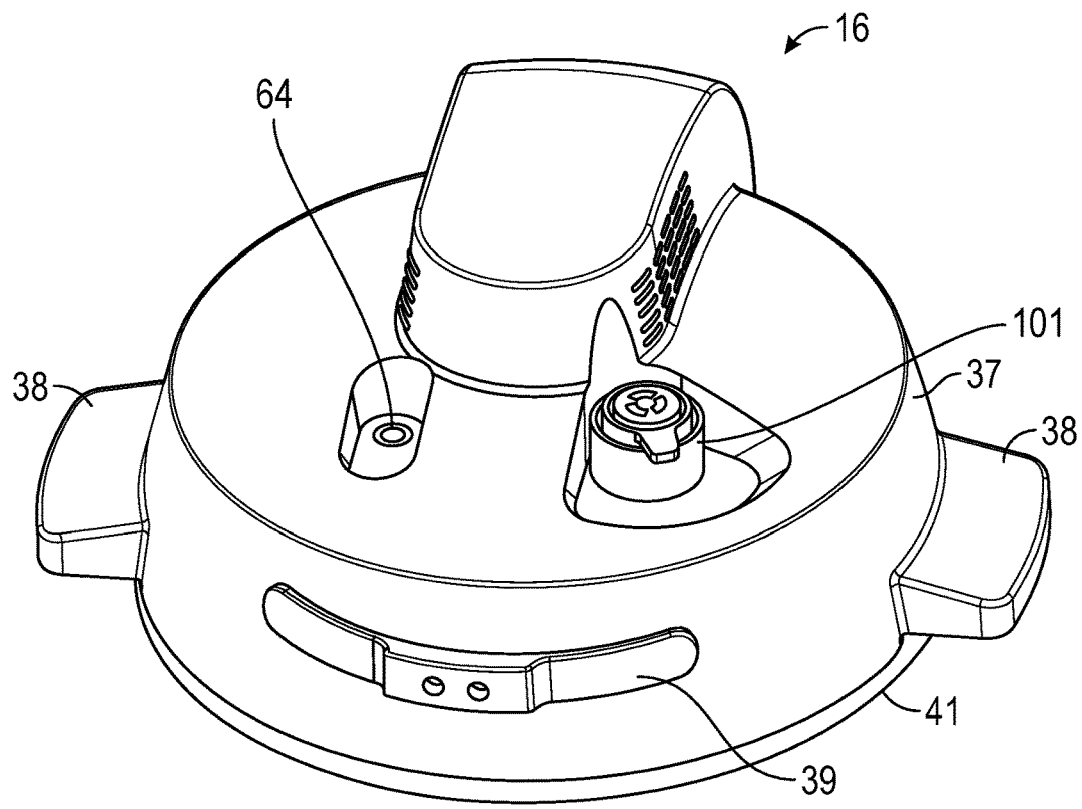
FIG. 4 is a front, top, perspective view of a lid of the cooking appliance of FIG. 1.
Figure 5:
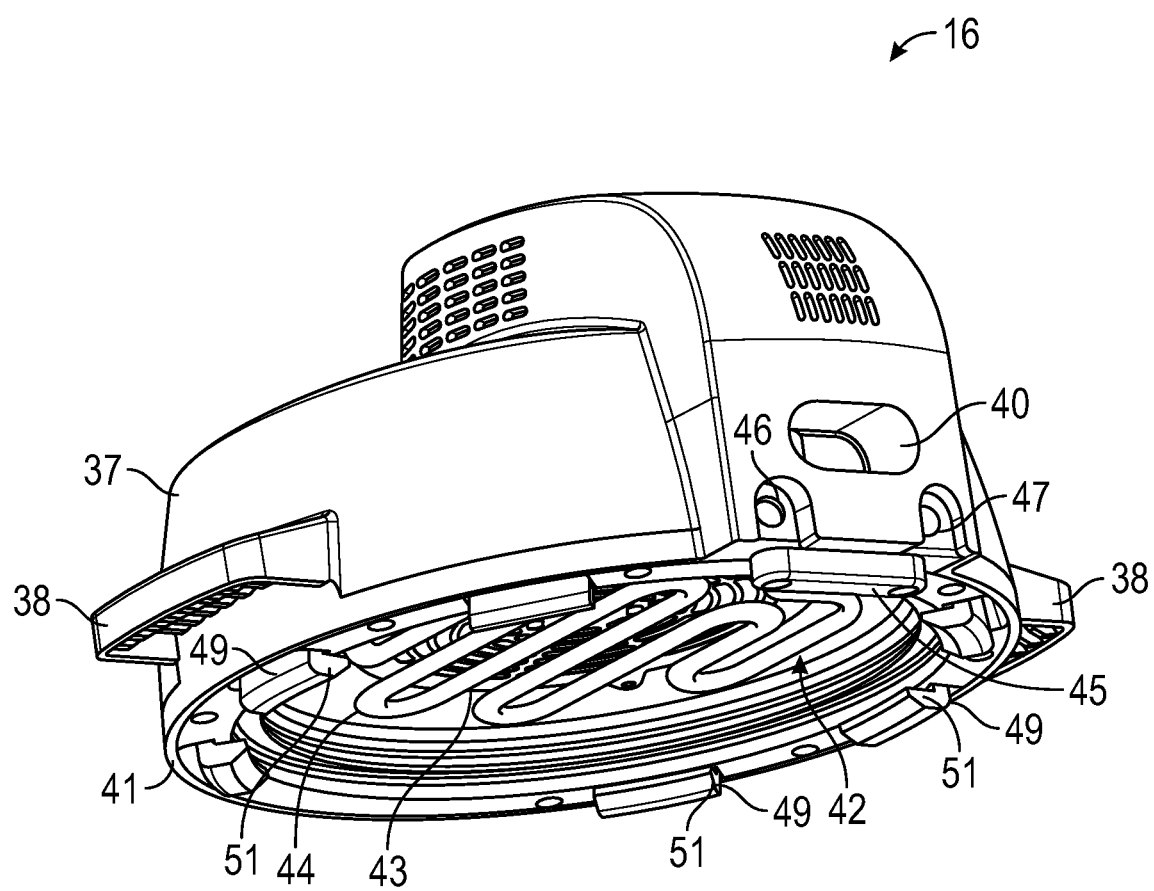
FIG. 5 is a rear, bottom, right-hand side perspective view of the lid of FIG. 4.

Referring to FIGS. 4 and 5, the lid 16 includes a body portion 37 having handles 38 extending outwardly therefrom. The handles 38 enable a user to lift the lid 16 off of the cooking pot 14 and/or base 12, shown in FIG. 1. The body portion 37 also includes a sliding lock actuator 39, shown in FIG. 4, on an outer surface thereof, and a vent hole 40, shown in FIG. 5, that extends through the body portion 37 to provide an exhaust exit from the interior of the cooking pot 14 when open. As discussed in greater detail below, the vent hole 40 is opening during some cooking modes and sealed shut during other cooking modes. As seen in FIG. 5, the body portion 37 is open on an underside 41 thereof and houses a fan and heater assembly 42 that includes a fan 43 and a heating coil 44. The underside 41 of the body portion 37 includes a lid locating feature 45 that is complimentary to the lid locating feature 33 at the upper end 32 of the lid support post 30, shown in FIG. 3, and configured to mate therewith to properly align the lid 16 relative to the base 12. The body portion 37 of the lid 16 also includes a power input port 46 and a control input port 47 configured to be connected to power and control cables, respectively, for providing electrical power and heating control to the fan 43 and heating coil 44 of the lid 16.

Figure 6:
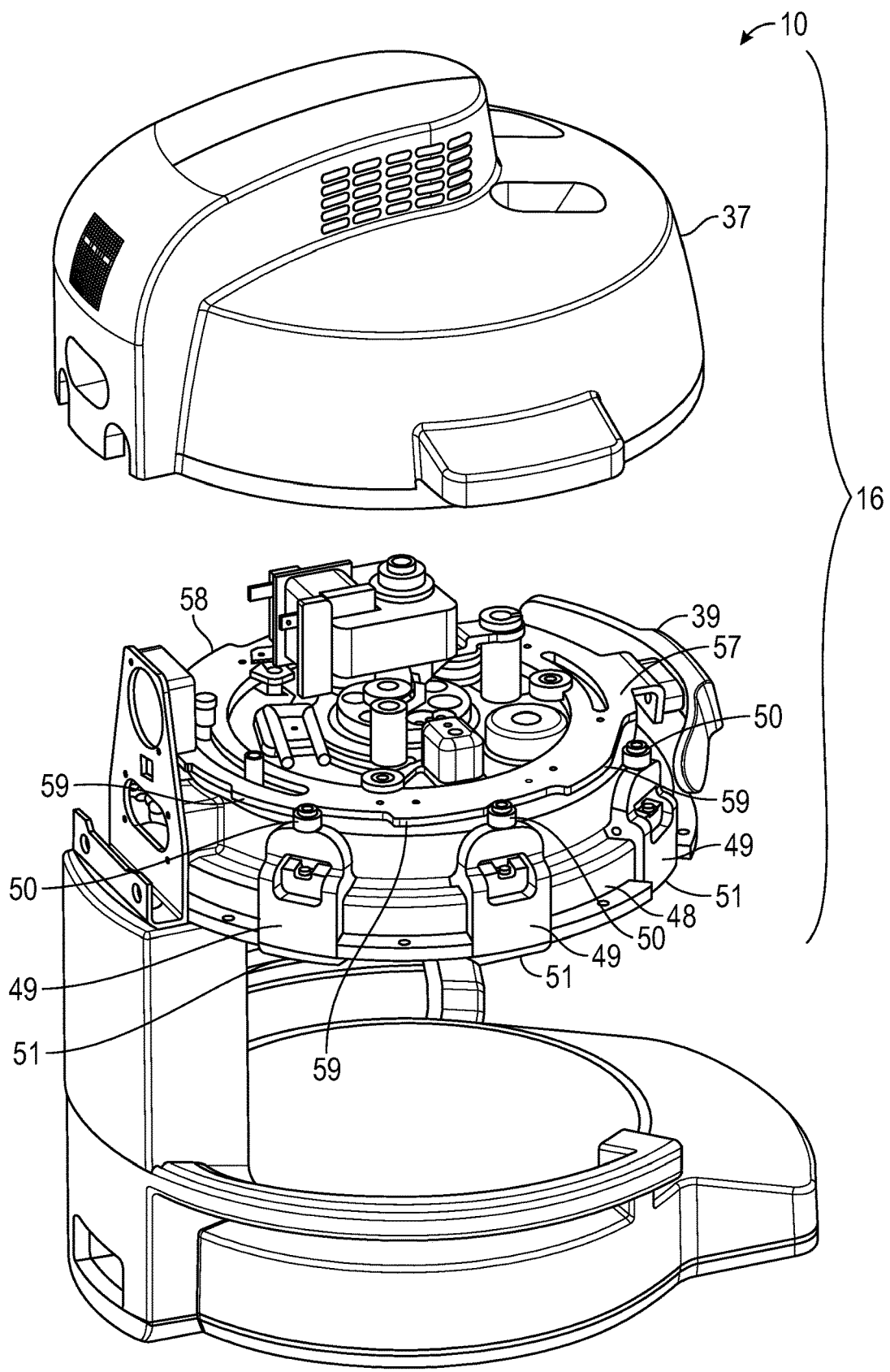
FIG. 6 is a partially exploded rear left-hand side perspective view of the cooking appliance of FIG. 1 without the cooking pot.
Figure 7:
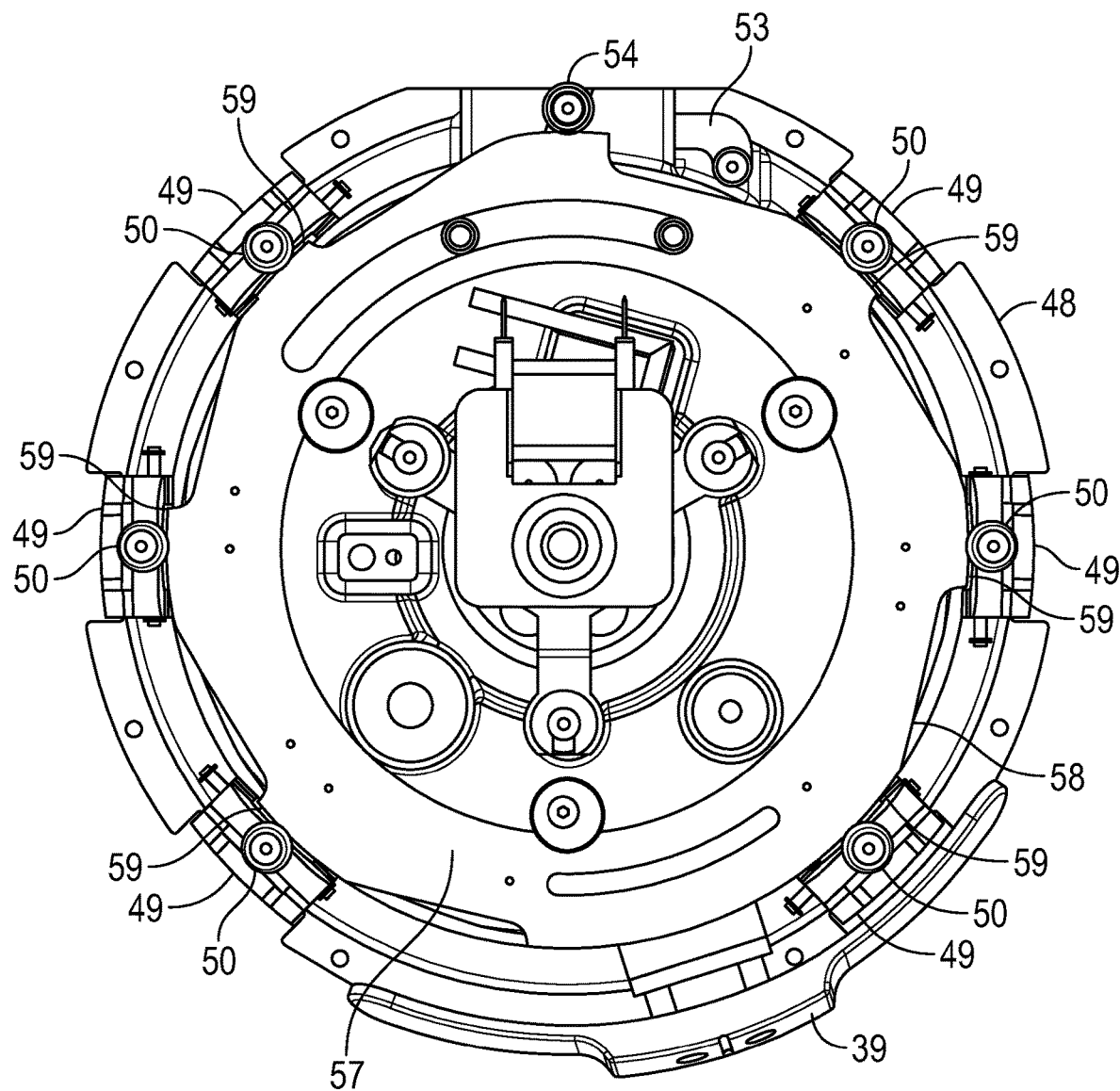
FIG. 7 is a bottom view of an inner cover of the cooking appliance of FIG. 1.
Figure 8:
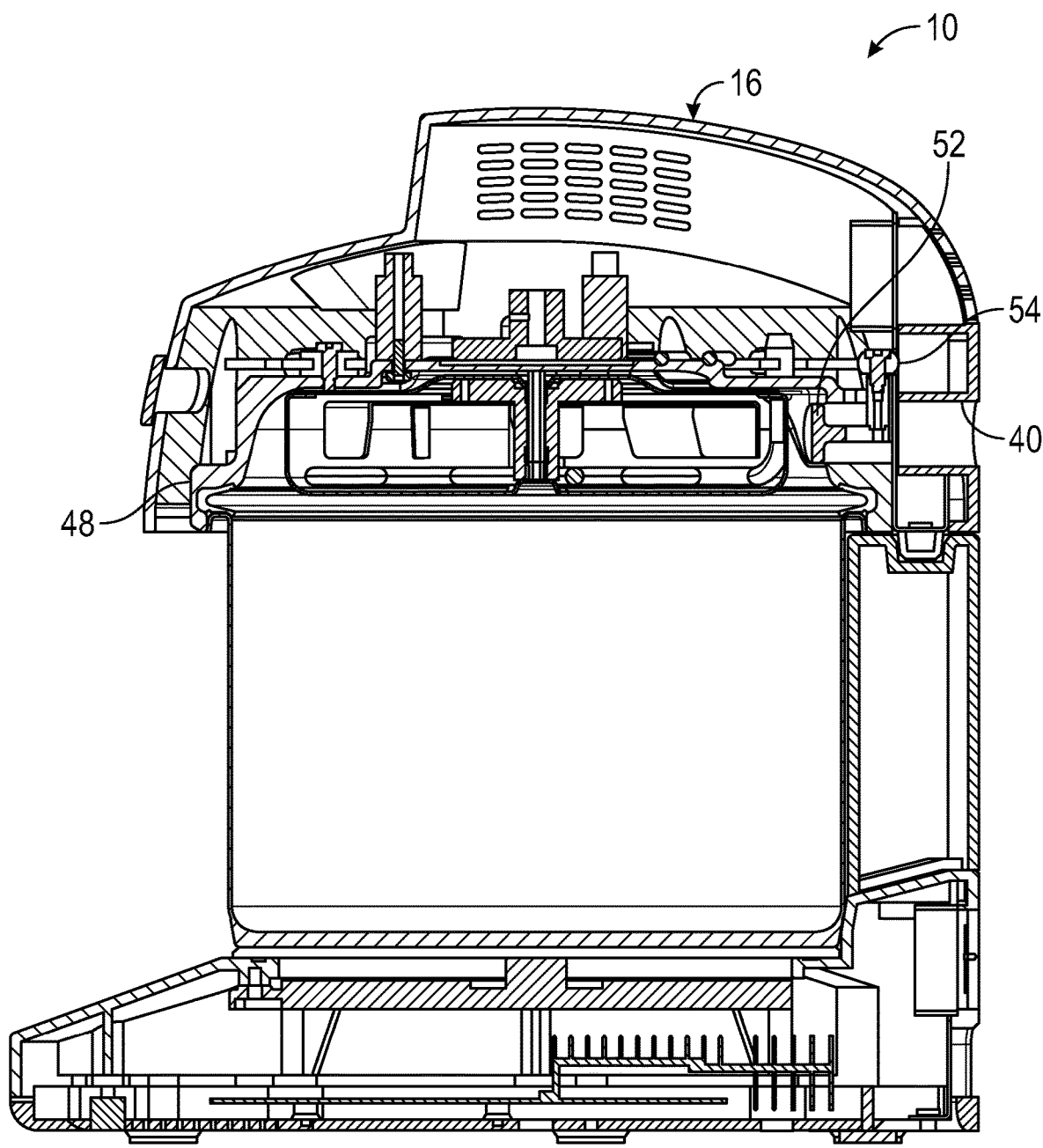
FIG. 8 is a right-hand side cross-sectional view of the cooking appliance of FIG. 1.
Figure 11:
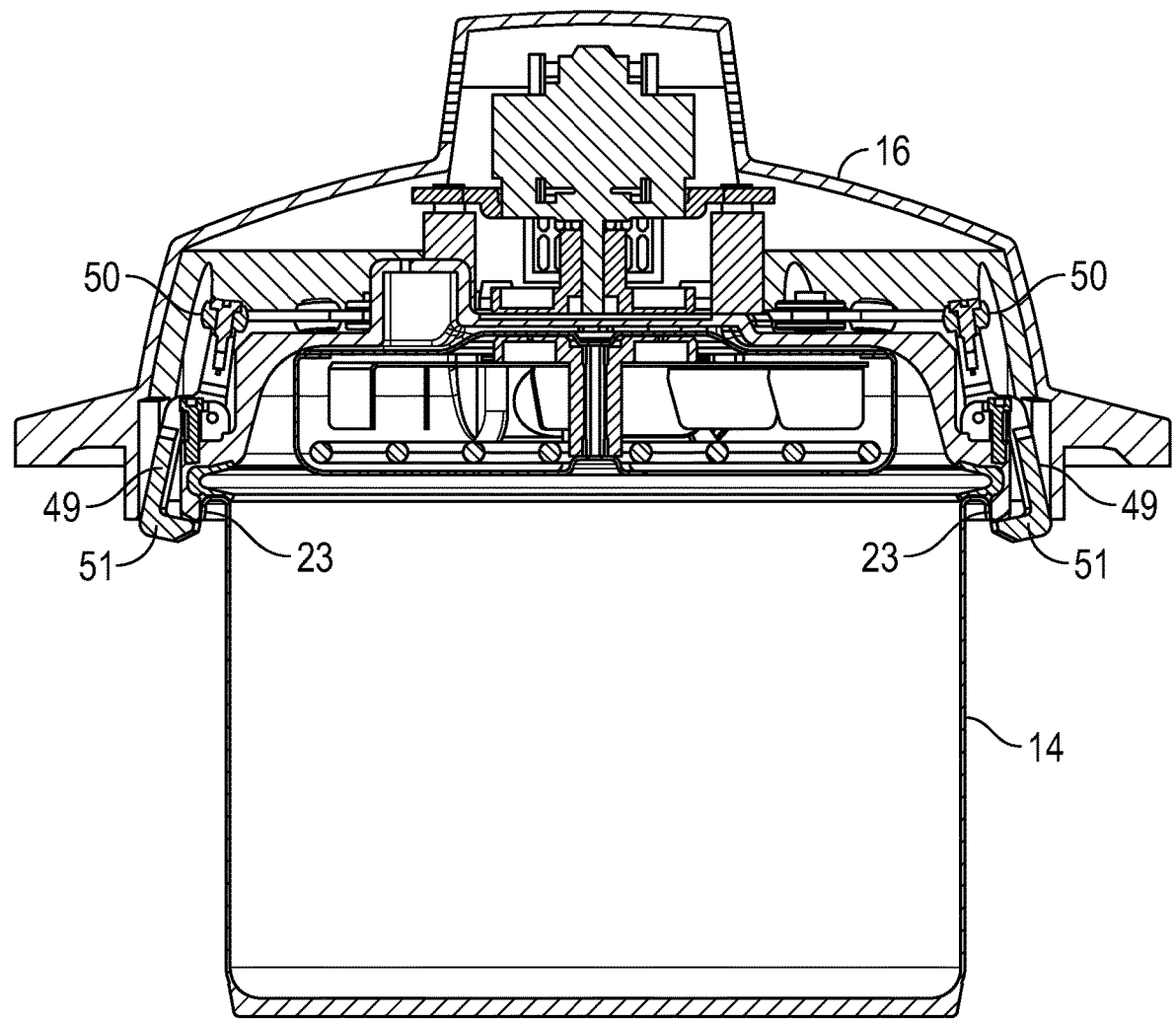
FIG. 11 is a front cross-sectional view of a portion of the cooking appliance of FIG. 1.
Figure 12:
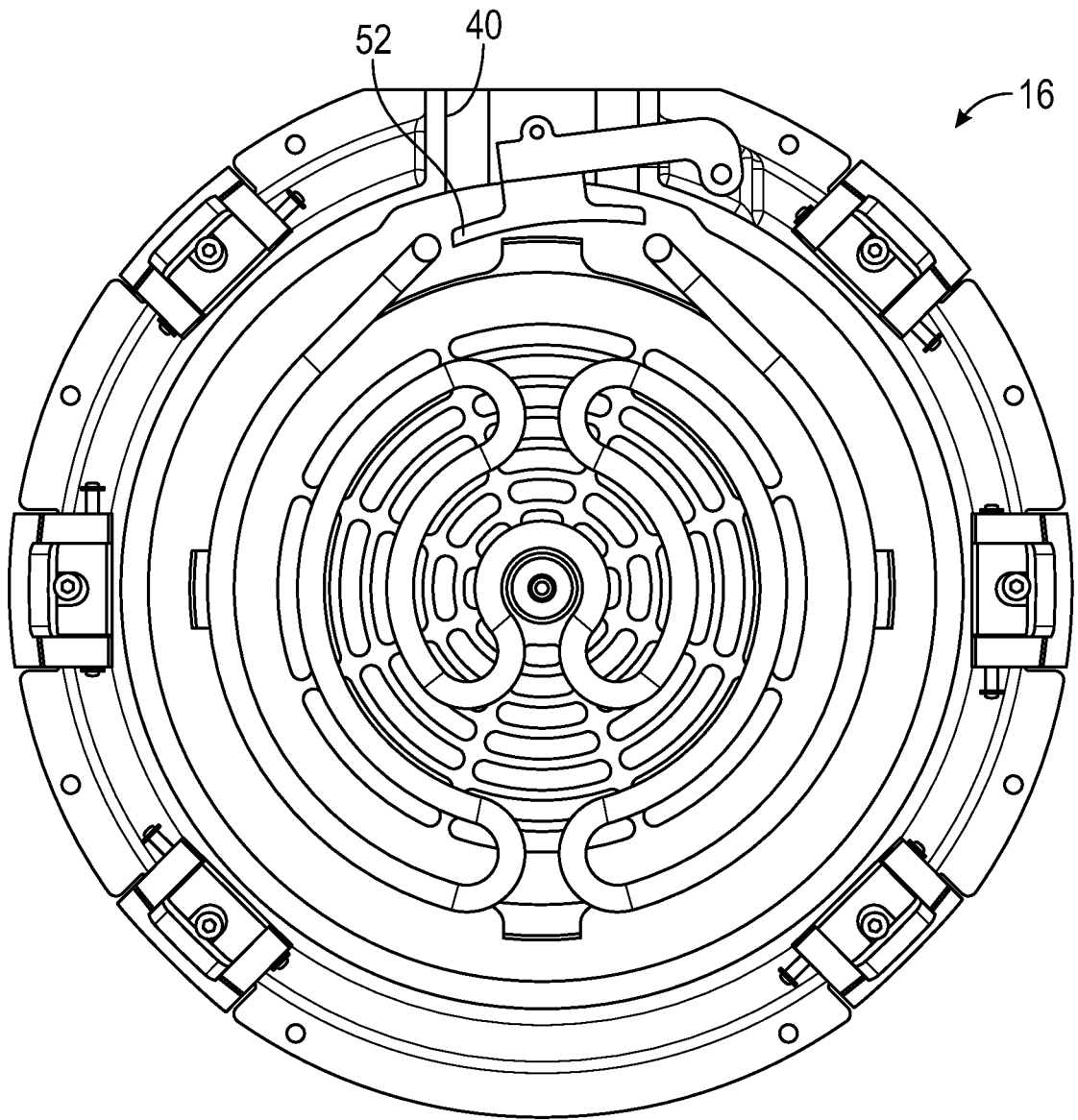
FIG. 12 is a bottom view of a lid of the cooking appliance of FIG. 1.
Figure 13:
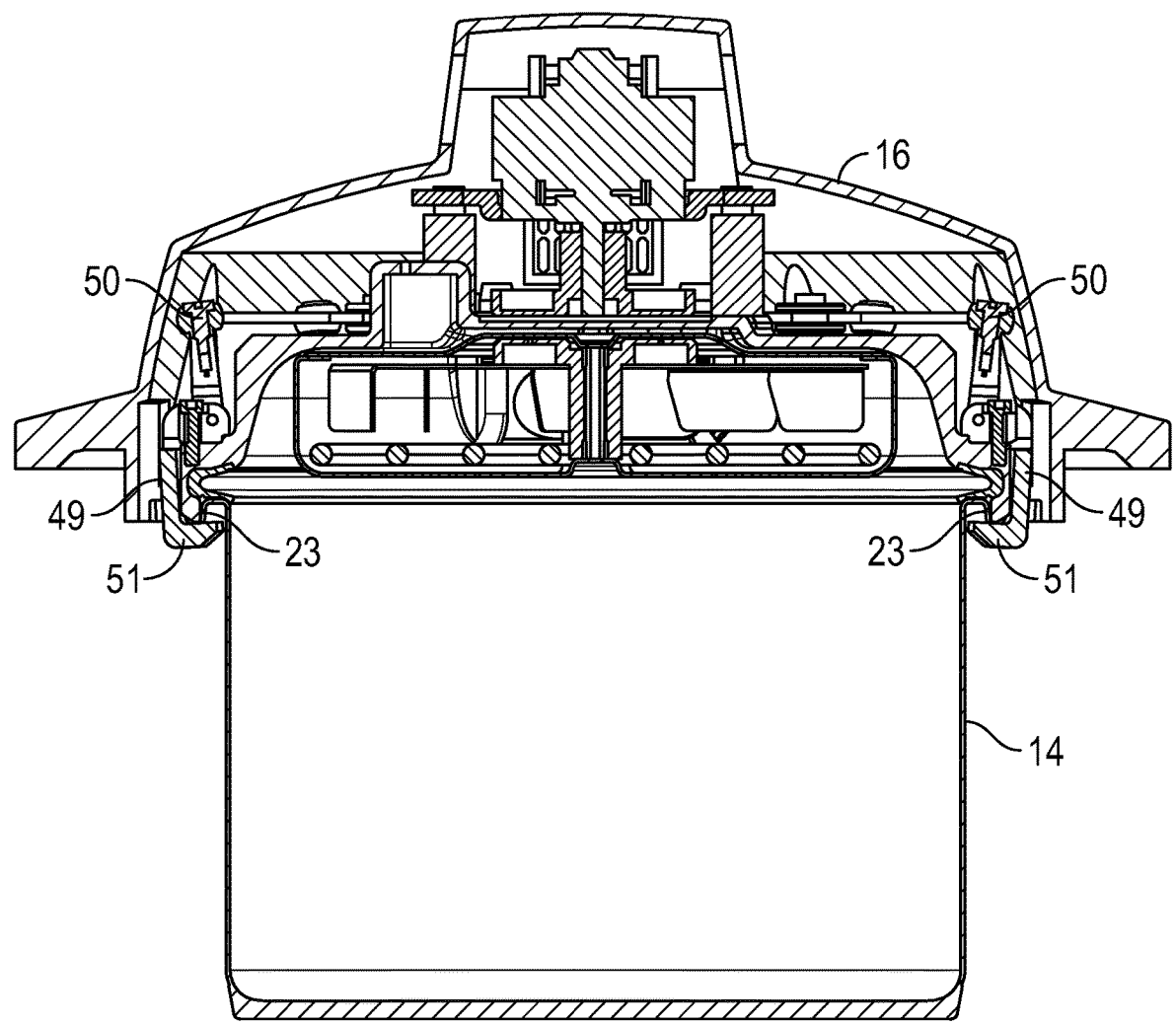
FIG. 13 is a front cross-sectional view of a portion of the cooking appliance of FIG. 1.
Figure 14:
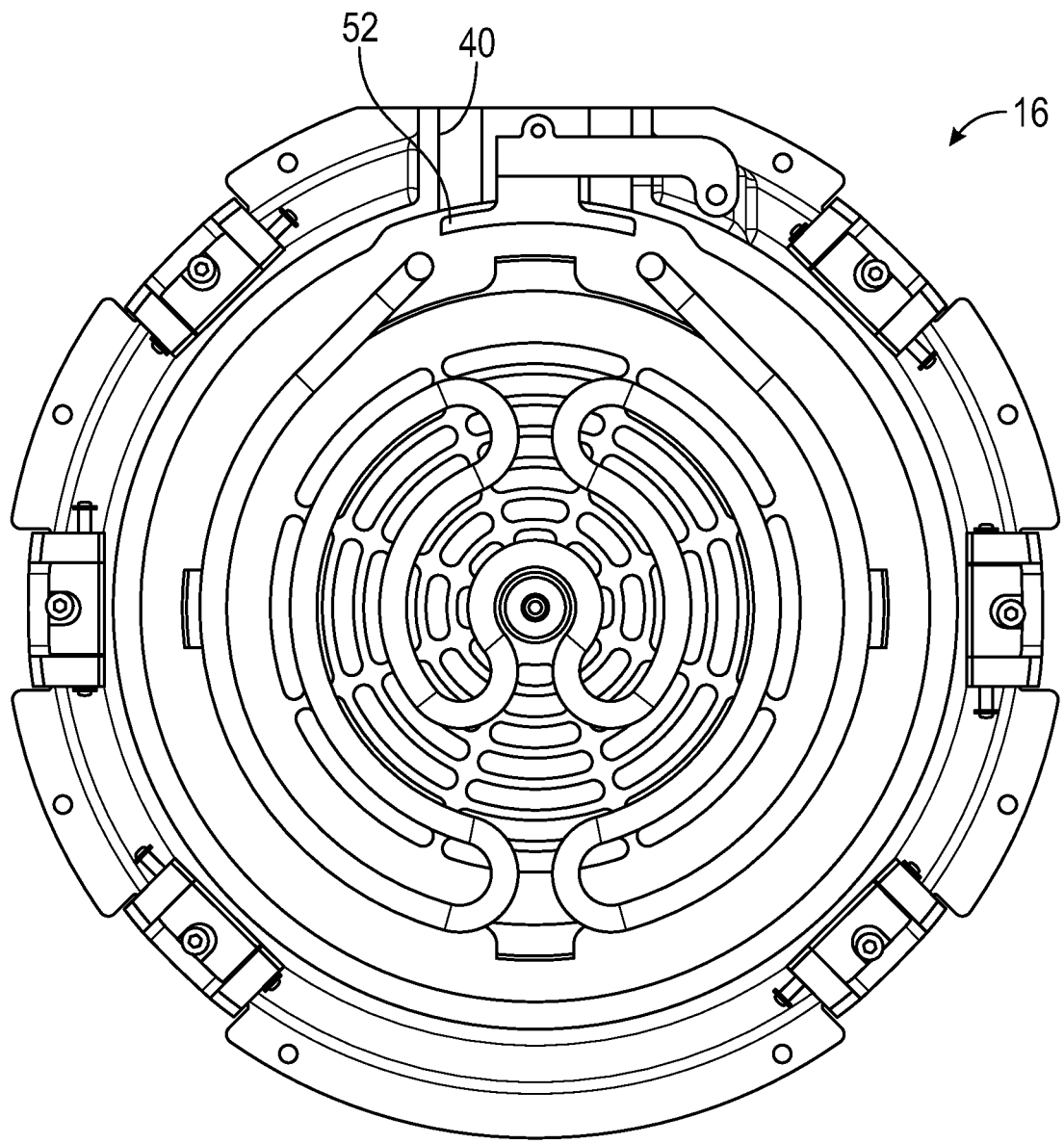
FIG. 14 is a bottom view of a lid of the cooking appliance of FIG. 1.

Referring to FIG. 6, the lid 16 includes an inner cover 48 disposed between the body portion 37 and the fan and heating assembly 42, shown in FIG. 5. As seen in FIGS. 6 and 7, the inner cover 48 includes a plurality of lock members 49 pivotally coupled to a periphery of the inner cover 48 in a generally circular configuration around the inner cover 48. Each lock member 49 has a cam follower 50 at an upper end thereof and an engagement hook portion 51 at a lower end thereof extending downward from the underside of the body portion 37 as see in FIG. 5. The engagement hook portions 51 are configured to engage the flange 23 of the cooking pot 14, shown in FIG. 2, when the lock members 49 are in a locked position. Referring to FIG. 8, a vent seal member 52 is pivotally coupled to the inner cover 48 of the lid 16 via a pivot arm 53, shown in FIG. 7, at an end of the vent hole 40 opening into the interior of the cooking appliance 10. The vent seal member 52 includes a cam follower 54 extending upwardly therefrom. Referring back to FIGS. 6 and 7, a lock ring 57 disposed on a upper surface of the inner cover 48 is fixedly coupled to the sliding lock actuator 39 and is configured to rotate when the sliding lock actuator 39 moves between an unlocked position shown in FIG. 9 and a locked position shown in FIG. 10, and vice versa. The lock ring 57 has an outer edge 58 in contact with the cam followers 50 of the lock members 49 and the cam follower 54 of the vent seal member 52. The outer edge 58 includes a plurality of outwardly protruding cam features 59 that drive the cam followers 50 of the lock members 49 and cam follower 54 of the vent seal member 52 outward when the sliding lock actuator 39 is moved to the locked position from the unlocked position. FIGS. 11 and 12 show the lid 16 when the sliding lock actuator 39 is in the unlocked position of FIG. 9. As seen in FIG. 11, in this position, the cam followers 50 are pivoted inward and the hook portions 51 of the lock members 49 are not engaging the flange 23 of the cooking pot 14, thereby allowing the lid 16 to be removed from the cooking pot 14. Additionally, as seen in FIG. 12, in this unlocked position, the vent sealing member 52 is pivoted radially inward so that the vent hole 40 is open. FIGS. 13 and 14 show the lid 16 when the sliding lock actuator 39 is in the locked position of FIG. 10. As seen in FIG. 13, when the sliding lock actuator 39 is moved to the locked position of FIG. 10, the outward movement of the cam followers 50 causes the hook portions 51 of the lock members 49 to pivot inward and engage the flange 23 of the cooking pot 14 when the lid 16 is positioned on the cooking pot 14, thereby securing the lid 16 to the cooking pot 14. Additionally, as seen in FIG. 13, in this locked position, the outward movement of the cam follower 54, shown in FIGS. 7 and 8, causes the vent sealing member 52 to pivot radially outward and seal the vent hole 40 closed. Thus, in addition to securing the lid 16 to the cooking pot 14, moving the sliding lock actuator 39 from the unlocked position shown in FIG. 9 to the locked position shown in FIG. 10 actuates the vent seal member 52 to close and seal the vent hole 40, which allows the inner cover 48 to function as a pressure plate during operation of the cooking appliance 10 as a pressure cooker by maintaining cooking pressure within the cooking pot 14.

Figure 15:
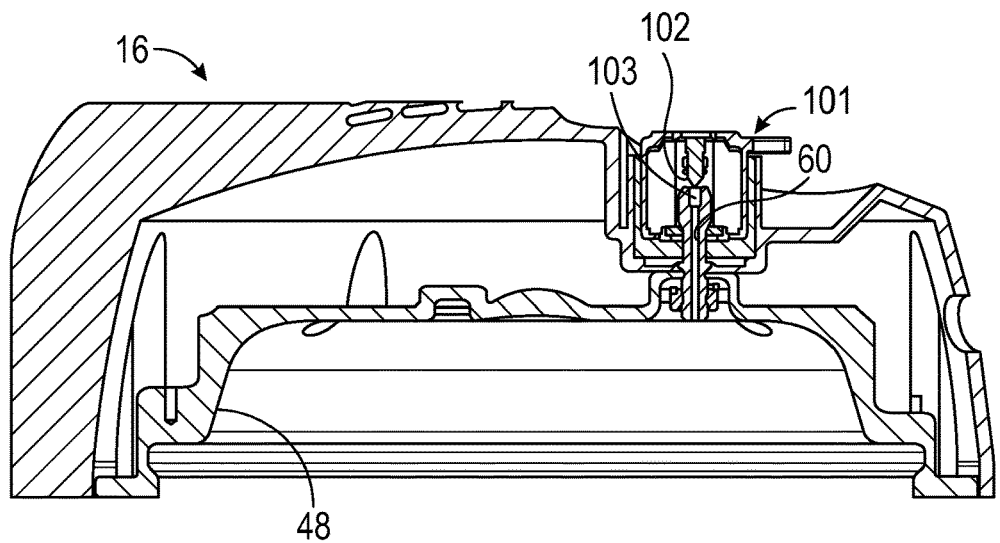
FIG. 15 is a left-hand side cross-sectional view of the lid of FIG. 4.
Figure 16:
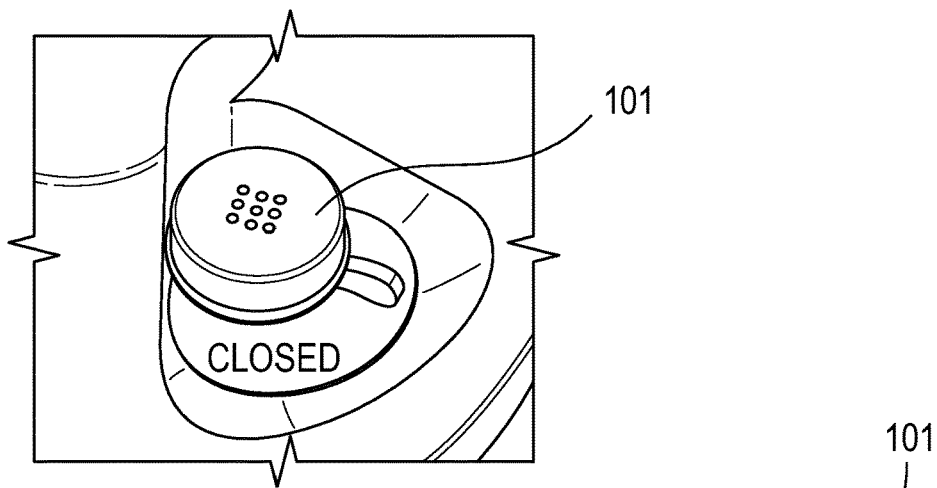
FIG. 16 is a top view of a pressure release valve of the lid of FIG. 15 in a closed position.
Figure 17:
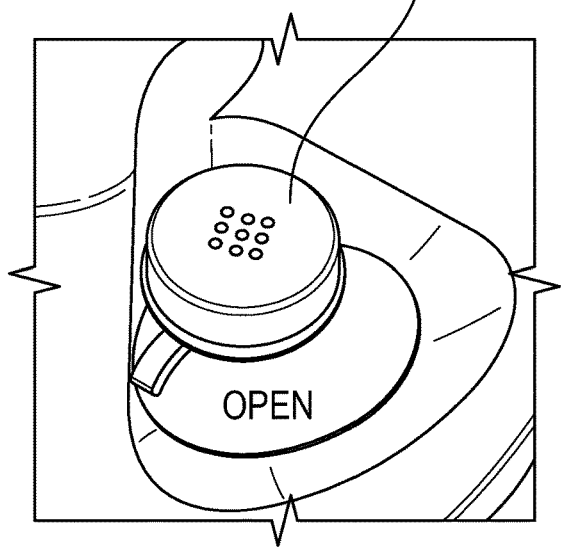
FIG. 17 is a top view of a pressure release valve of the lid of FIG. 15 in an open position.

Referring to FIG. 15, the lid 16 includes pressure release valve opening 60 that extends through the inner cover 48 for controlling pressure within the cooking pot 14, shown in FIG. 1, during pressure cooking operation. The pressure release valve opening 60 has a valve cover 101 that is manually moveable between a closed position in which a valve pin 102 engages and blocks off the port 103 of the valve opening 60, shown in FIG. 16, in which the cooking appliance 10 may be pressurized, and an open position, shown in FIG. 17, in which the valve pin 102 disengages from and unblocks the port 103 of the valve opening 60 so that the cooking appliance 10 releases pressure from within the cooking pot 14.

Figure 18:
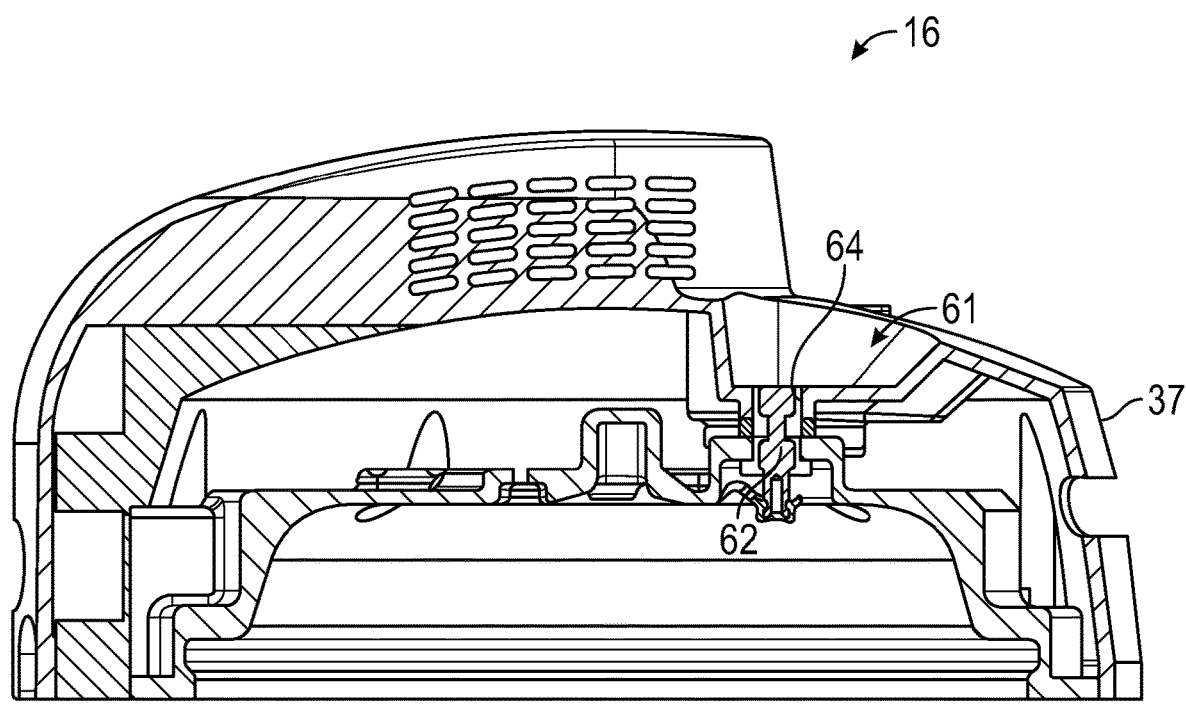
FIG. 18 is a left-hand side cross-sectional view of the lid of FIG. 4.

Referring to FIG. 18, the lid 16 also includes a pressure actuated safety lock assembly 61 that prevents the lid 16 from being removed from the cooking pot 14, shown in FIG. 1, when the cooking pot 14 is pressurized. The safety lock assembly 61 includes a pressure valve member 62 and an opening 64 formed in the body portion 37 of the lid 16. The pressure valve member 62 is coupled to the sliding lock actuator 39, shown in FIG. 6, through the lock ring 57.

Figure 10:
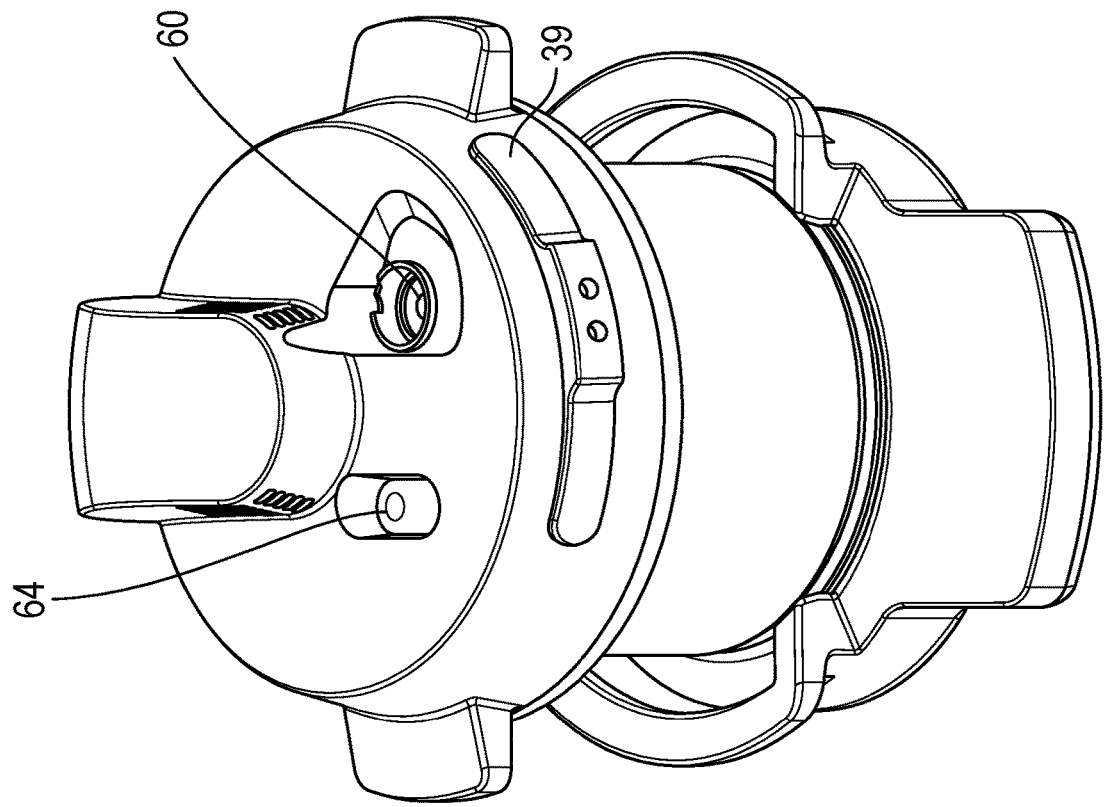
FIG. 10 is a front top perspective view of the cooking appliance of FIG. 1 in a locked position.
Figure 9:
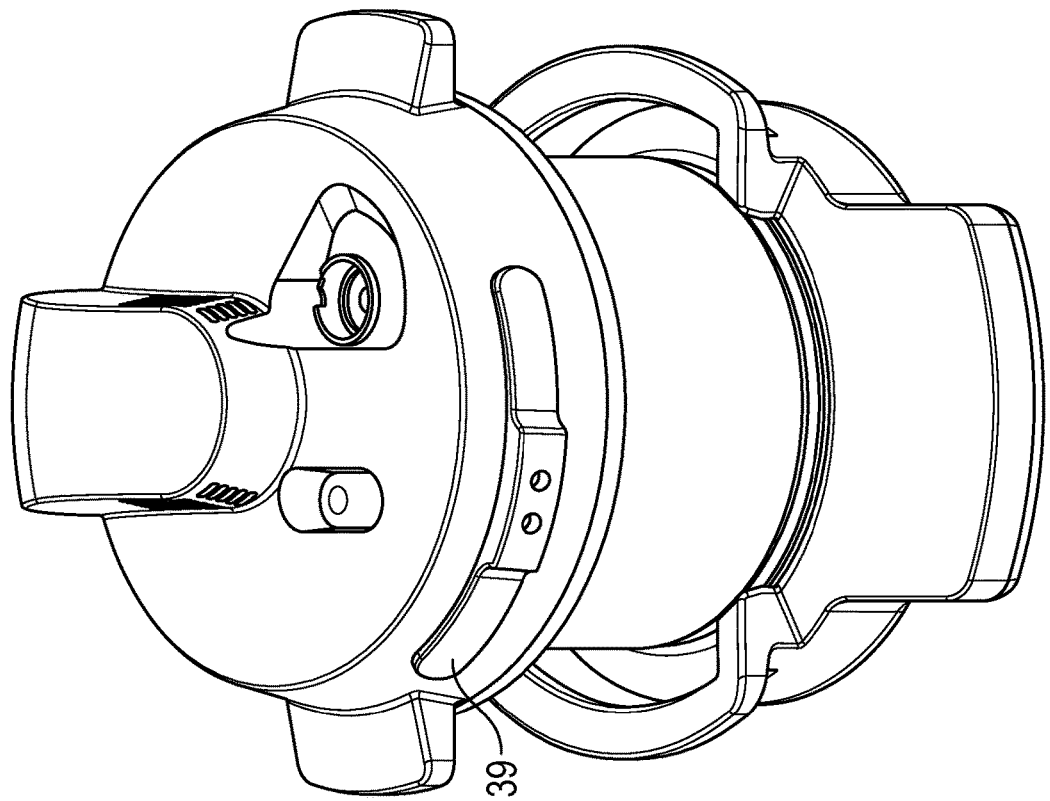
FIG. 9 is a front top perspective view of the cooking appliance of FIG. 1 in an unlocked position.
Figure 19:
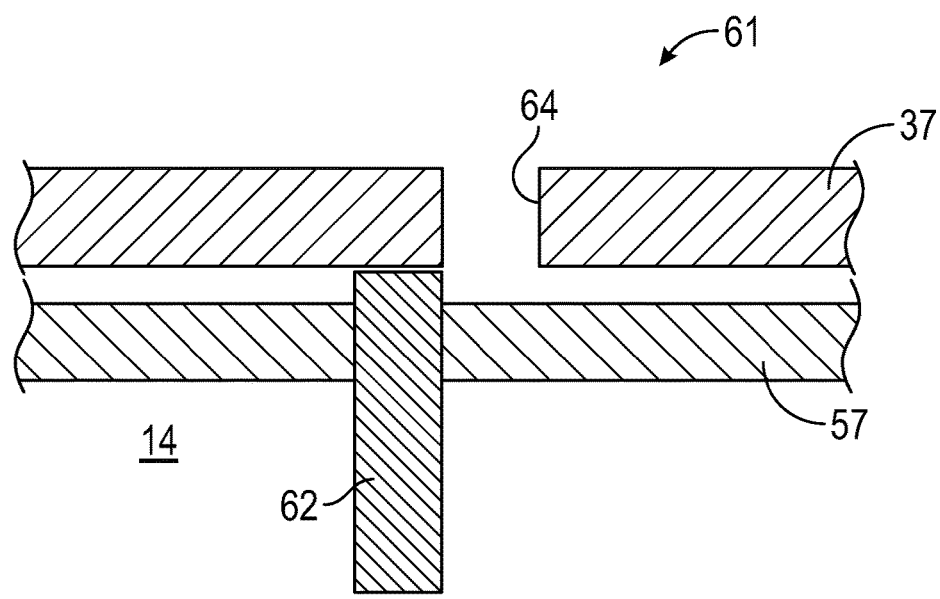
FIG. 19 is a schematic cross-sectional view of a safety lock assembly of the lid of FIG. 18.
Figure 20:
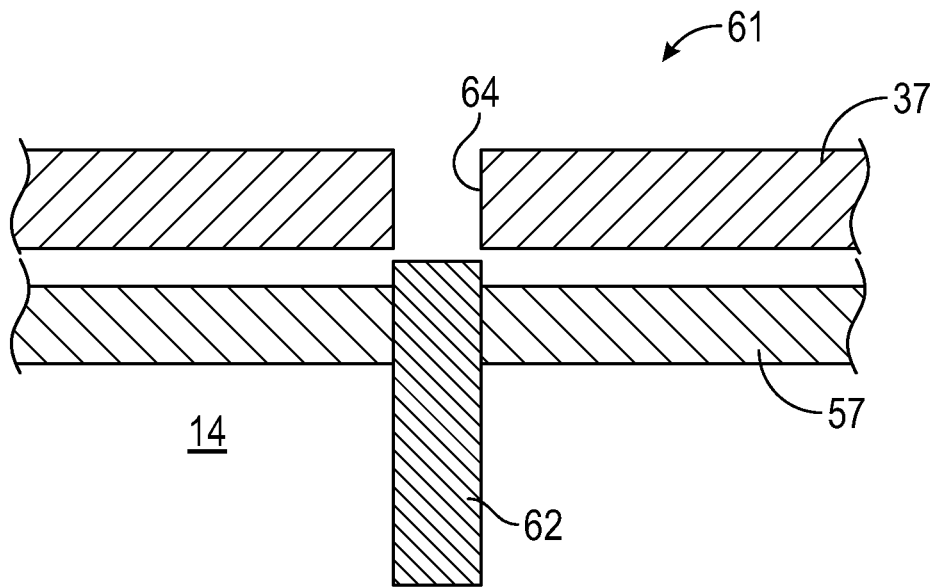
FIG. 20 is a schematic cross-sectional view of a safety lock assembly of the lid of FIG. 18.

Referring to FIGS. 19 and 20, the pressure actuated safety lock assembly 61 is shown in an unlocked state, in which the cooking pot 14 is not pressurized and the lock ring 57 and sliding lock actuator 39 coupled thereto, as shown in FIG. 6, may be moved back and forth between the unlocked position shown in FIG. 9 and the locked position shown in FIG. 10 because the pressure valve member 62 is not engaging the opening 64. With reference to FIG. 19, when the sliding lock actuator 39 is in the unlocked position, the pressure valve member 62 is not aligned with the opening 64 in the body portion 37. Conversely, as seen in FIG. 20, when the sliding lock actuator 39 is in the locked position in which the lid 16 is secured to the cooking pot 14 by the engagement between the locking members 49 and the flange 23, the pressure valve member 62 is aligned with and positioned below the opening 64 in the body portion 37.

Figure 21:
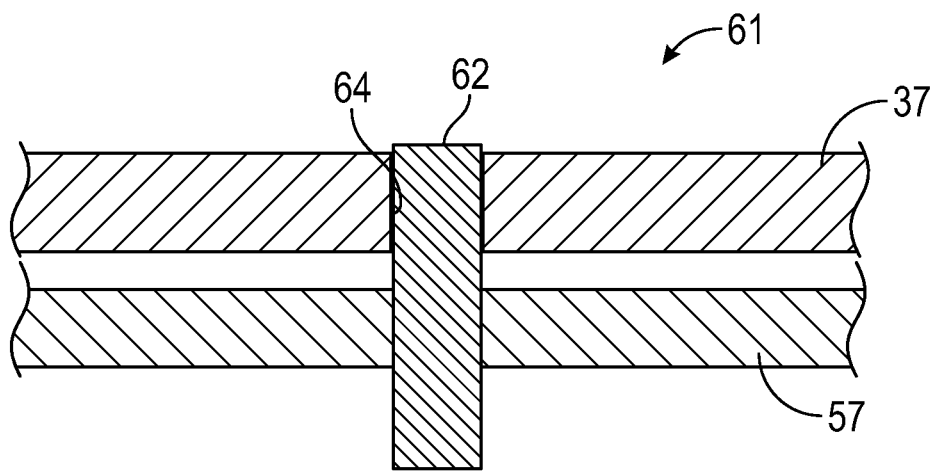
FIG. 21 is a schematic cross-sectional view of a safety lock assembly of the lid of FIG. 18.

In FIG. 21, the safety lock assembly 61 is shown in the locked state. The safety lock assembly 61 enters the locked state due to pressure buildup within the cooking pot 14, shown in FIG. 1, for example, during pressure cooking, when the lid 16 is secured to the cooking pot 14 in the closed position. The pressure buildup causes the pressure valve member 62 to slide upward from the position shown in FIG. 20 to the position shown in FIG. 21 where the pressure valve member 62 extends into the opening 64 in the body portion 37. In this raised position, the pressure valve member 62 prevents movement of the lock ring 57, which prevents the sliding lock actuator 39 from being rotated to the unlocked position shown in FIG. 9 from the locked position shown in FIG. 10. This, in turn, prevents the lid 16 from being detached from the cooking pot 14, shown in FIG. 1. The safety lock assembly 61 remains in the locked state until pressure within the cooking pot 14 decreases and the pressure valve member 62 returns to the position shown in the unlocked state of FIG. 20.

Figure 22:
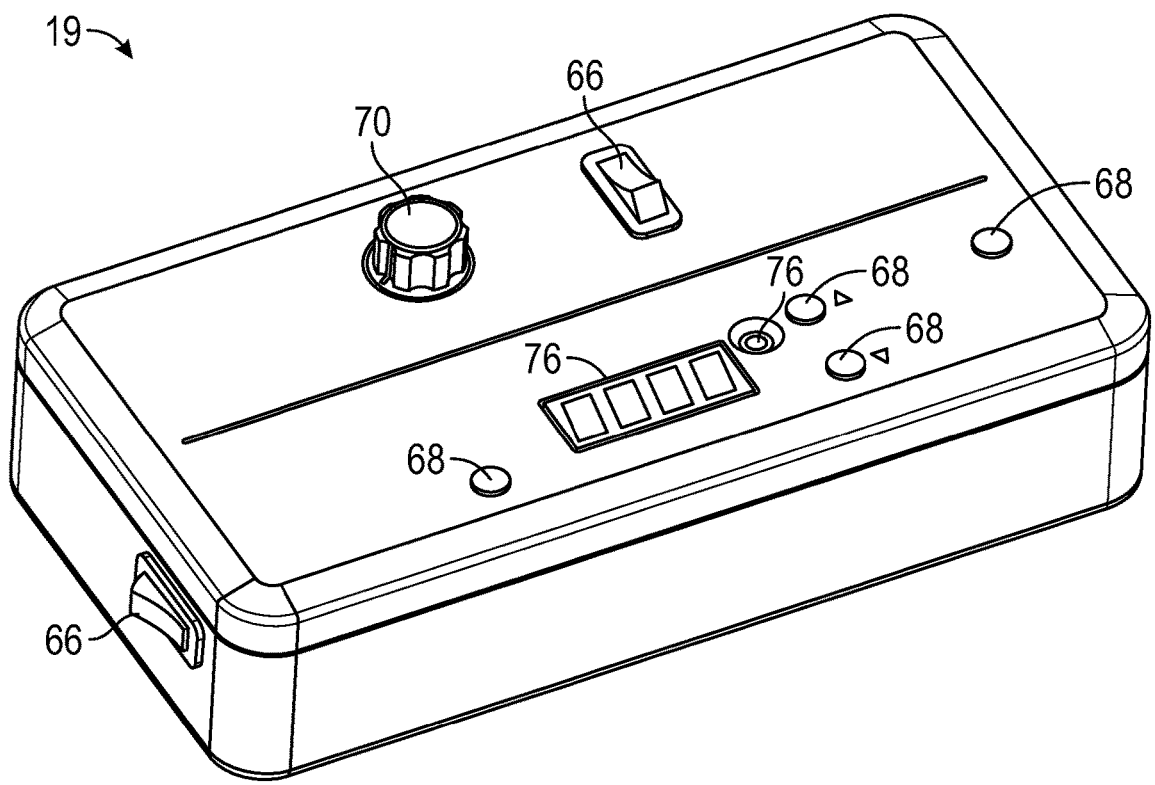
FIG. 22 is a front, top, left-hand side perspective view of a control unit of the cooking appliance of FIG. 1.
Figure 23:
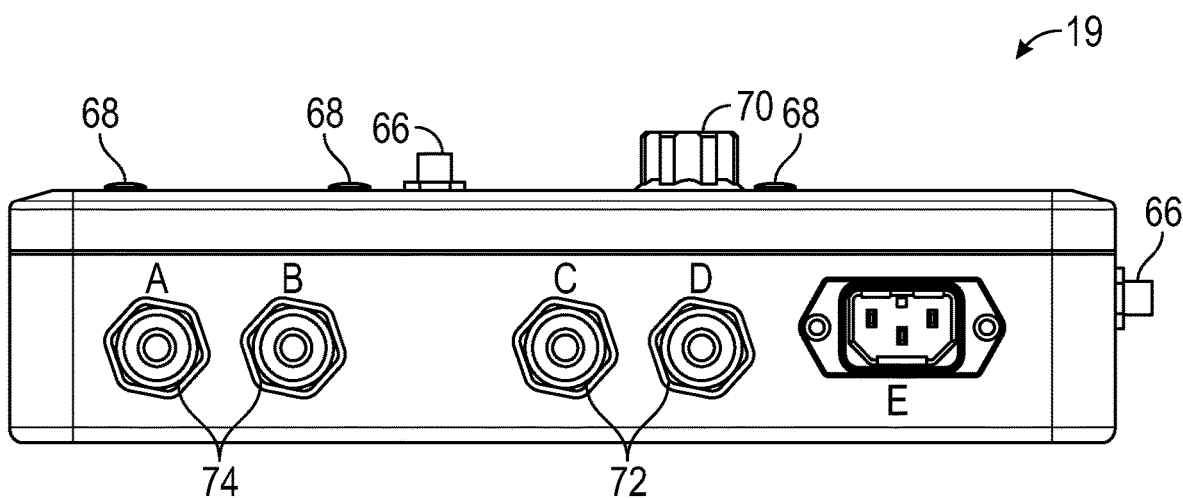
FIG. 23 is a rear view of the control unit of FIG. 22.
Figure 24:
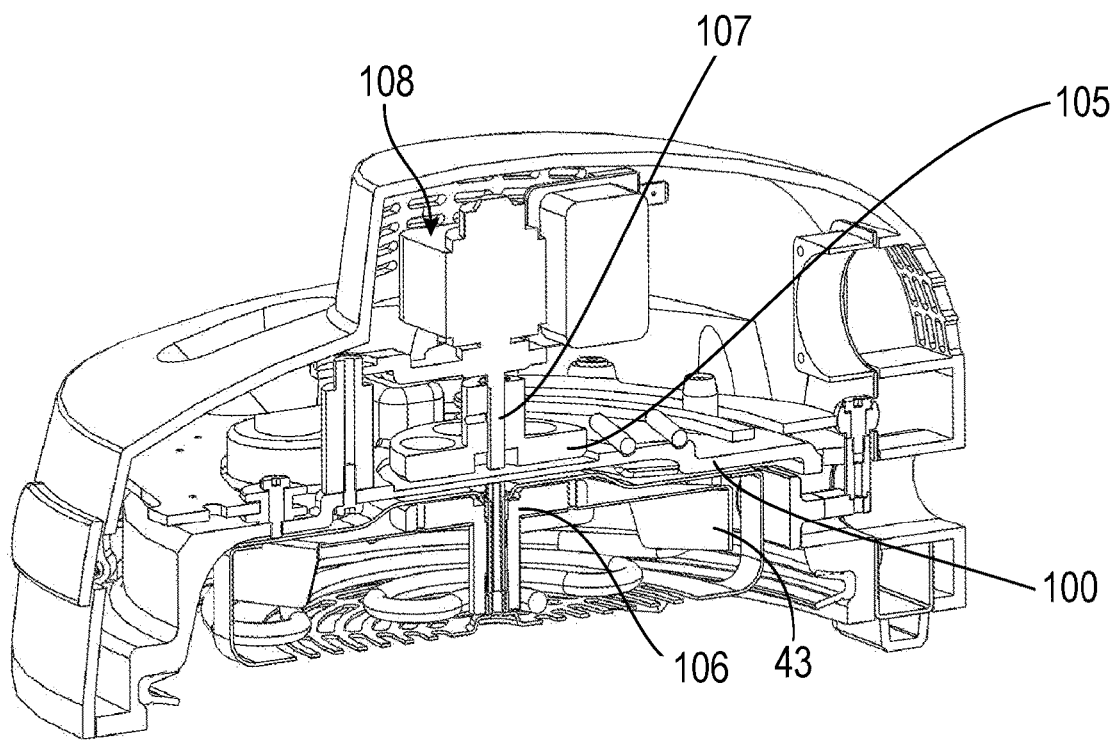
FIG. 24 is a front right-hand side perspective cross-sectional view of the lid of FIG. 4.
Figure 25:
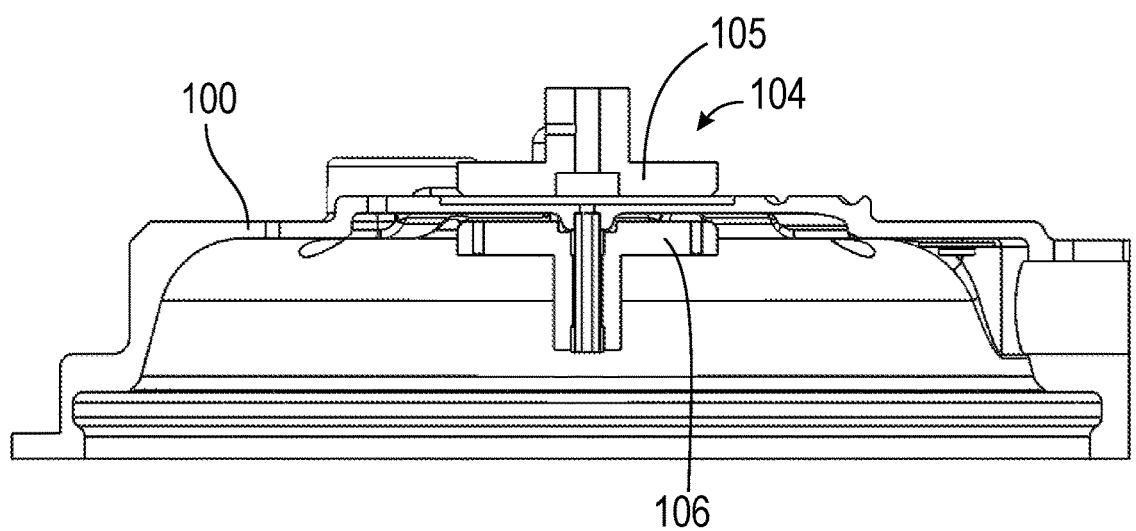
FIG. 25 is a right-hand side cross-sectional view of an inner cover of the lid of FIG. 4.
Figure 26:
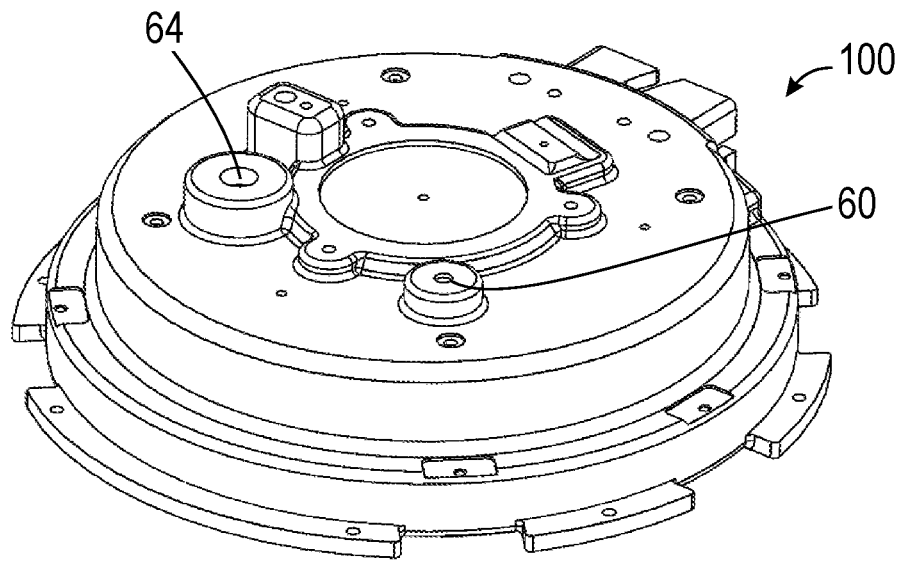
FIG. 26 is a front, top right-hand side perspective view of the inner cover of FIG. 25.
Figure 27:
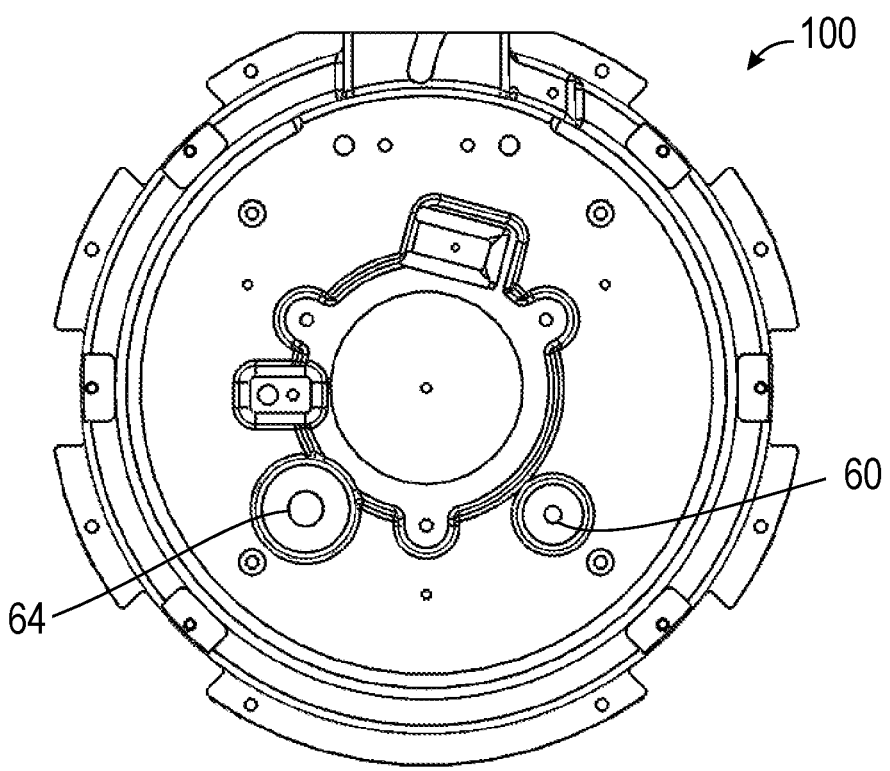
FIG. 27 is a top view of the inner cover of FIG. 25.
Figure 28:
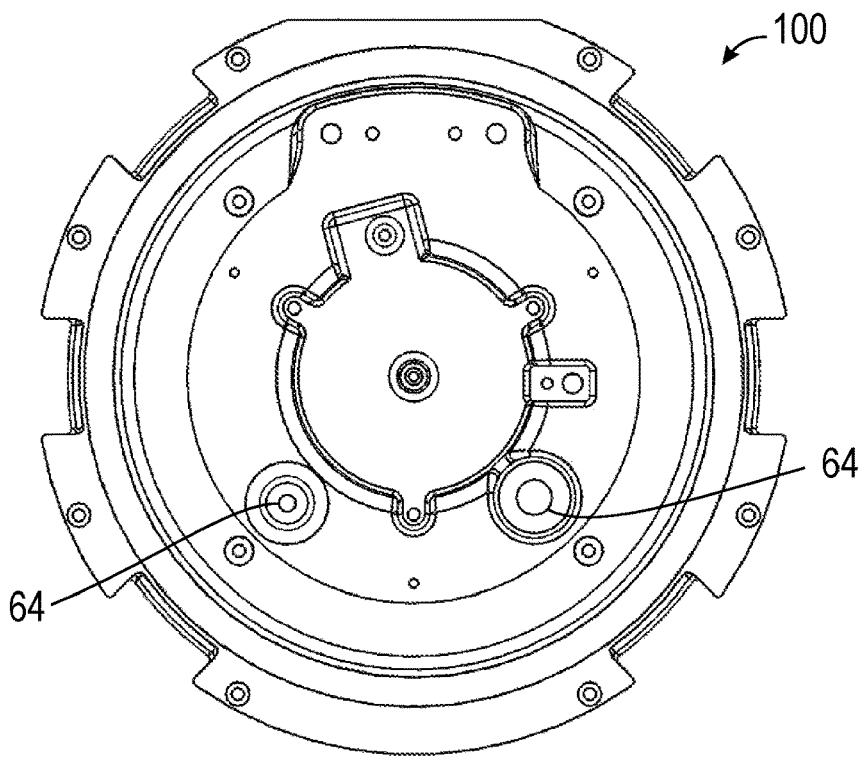
FIG. 28 is a bottom view of the inner cover of FIG. 25.

Referring to FIGS. 22 and 23, the control unit 19 for controlling operation of the cooking appliance 10 is shown. The control unit 19 includes a plurality of switches 66, buttons 68 and/or knobs 70 allowing for user setting and control of cooking functions of the cooking appliance 10. The control unit 19 also includes power output ports 72 and control output ports 74, shown in FIG. 23, configured to be connected to the power input port 34 and control input port 35 of the base 12, respectively, shown in FIG. 3, for providing electrical power and heating control to the cooktop 28 and to the power input port 46 and control input port 47 of the lid 16, respectively, shown in FIG. 5, for providing electrical power and heating control to the heater assembly 42, including the fan 43 and heating coil 44. The control unit 19 may also include one or more displays 76, shown in FIG. 22, such as a screen, a light indicator, or the like, for displaying information relevant to operation of the cooking appliance 10. The control unit 19 includes all of the necessary electronics, coding, software, memory, storage, databases, firmware, logic/state machines, and/or microprocessors to perform the cooking functions described herein and/or to achieve the results described herein. The display 76 may be an LCD display screen, LED display screen, or the like and may be configured to display cooking information such as a cooking mode, cooking time, cooking temperature at which the cooking appliance 10 has been set to cook, measured temperature within the cooking appliance 10, and/or the like.

Although the control unit 19 is shown and described as a separate unit from the base 12 and lid 16, shown in FIG. 2, the control unit 19 may instead be incorporated into the base 12 with the various switches 66, buttons 68, knobs 70 and/or display screen 76 being located on the body 27 of the base 12. With such an integral control unit, the upper end 32 of the lid support post 30 of the base 12 and the underside 41 of the body portion 37 of the lid 16 may include power and control contacts that engage when the lid 16 is properly positioned on the lid support post 30 of the base 12 to allow the control unit integrally formed with the base 12 to provide electrical power and control signals to the heater assembly 42, including the fan 43 and heating coil 44 located in the lid 16.

Referring back to FIG. 2, in operation, the cooking appliance 10 may be configured and operated in a variety of different cooking modes to cook food items according to different cooking methods, including a sauté mode, a pressure cooker mode, an air fryer mode, and/or a broiler/browning oven mode. In sauté mode, the base 12 is used alone, without the cooking pot 14, lid 16 or cooking basket 18. The power input port 34 and control input port 35 of the base 12, shown in FIG. 3, are connected to the power output port 72 and control output port 74 of the control unit 19, respectively, so that the control unit 19 may be used to control operation of the cooktop 28. The desired temperature setting for the cooktop 28 is set on the control unit 19 and any appropriately sized pot or pan may be placed on the cooktop 28 and used to cook food items therein.

In pressure cooker mode, the base 12, cooking pot 14, and lid 16 are used, without the cooking basket 18. Like in sauté mode, in pressure cooker mode, the power input port 34 and control input port 35 of the base 12 are connected to the power output port 72 and control output port 74 of the control unit 19, respectively, so that the control unit 19 may be used to control operation of the cooktop 28. Food items to be cooked in the pressure cooker are placed within the cooking pot 14 and the cooking pot 14 is positioned on the cooktop 28 of the base 12. The lid 16 is positioned on top of the cooking pot 14, with the lid locating feature 45 of the lid 16, shown in FIG. 5, engaging the complimentary lid locating feature 33 at the upper end 32 of the lid support post 30 of the base 12 to properly align the lid 16 relative to the base 12 and cooking pot 14. The sliding lock actuator 39 is then rotated from the unlocked position to the locked position to secure the lid 16 on the upper end of the cooking pot 14 and to close the vent hole 40 as shown in FIG. 14. When the lid 16 is closed in the locked position, the inner cover 48 of the lid 16 contacts the upper rim of the cooking pot 14 and provides a seal around the upper rim of the cooking pot 14 between the cooking pot 14 and the lid 16.

To commence pressure cooking, the user selects the desired temperature setting for the cooktop 28 on the control unit 19. In pressure cooking mode, the cooktop 28 below the cooking pot 14 heats up the cooking pot 14 and food items therein. Since the cooking pot 14 is sealed due to the closure of vent hole 40, both pressure and temperature within the cooking pot 14 increase with the increasing temperature, thereby pressure cooking the food items in the cooking pot 14. As shown in FIG. 21, as the pressure within the cooking pot 14 increases, the pressure valve member 62 slides upward into the opening 64 formed in the body portion 37 of the lid 16 to put the safety lock assembly 61 in the locked state. This prevents the sliding lock actuator 39 from being rotated to the unlocked position and, therefore, prevents the lid 16 from being opened and removed from the cooking pot 14. During pressure cooking operation, temperature of the cooking pot 14 may be monitored by a temperature sensor and may be used by the control unit 19 to control operation of the cooking appliance 10, for example, by controlling the cooktop 28 and/or the pressure release valve 60, shown in FIG. 16, to maintain a desired pressure and/or temperature within the cooking pot 14. The temperature detected by the temperature sensor may also be used to display cooking information on the control unit 19. During pressure cooking operation, the fan 43 and heating coil 44 disposed in the lid 16 remain off and are not used. When the cooking appliance 10 finishes pressure cooking the food items in the cooking pot 14, the cooktop 28 may be turned off and the pressure within the cooking pot 14 may be decreased by activating the pressure release valve 60, shown in FIGS. 16-17. As the pressure within the cooking pot 14 decreases, the pressure valve member 62, shown in FIG. 21, slides down and out of the opening 64, shown in FIG. 21, to the unlocked state shown in FIG. 20, thereby allowing the sliding lock actuator 39 to be rotated to the unlocked position and the lid 16 to be removed from the cooking pot 14 and opened.

In air fryer mode, the base 12, cooking pot 14, lid 16, and cooking basket 18 are all used. The power input port 46 and a control input port 47 of the lid 16, shown in FIG. 5, are connected to the power output port 72 and control output port 74 of the control unit 19, respectively, so that the control unit 19 may be used to control operation of the fan 43 and heating coil 44, shown in FIG. 5, disposed in the lid 16. Food items to be cooked in the air fryer are placed within the basket 18 and the basket 18 is positioned within the cooking pot 14. The cooking pot 14 is positioned on the cooktop 28 of the base 12, and the lid 16 is positioned on top of the cooking pot 14, with the lid locating feature 45 of the lid 16, shown in FIG. 5, engaging the complimentary lid locating feature 33 at the upper end 32 of the lid support post 30 of the base 12 to properly align the lid 16 relative to the base 12 and cooking pot 14. In air fryer mode, after the lid 16 is positioned on the cooking pot 14, the sliding lock actuator 39 is left in the unlocked position so that the vent hole 40 remains open and pressure buildup within the cooking pot 14 is prevented.

To commence air frying, the user uses the control unit 19 to turn on the fan 43 and to select a desired temperature setting for the heating coil 44. In air frying mode, the heating coil 44 heats up and the fan 43 blows to heat the interior of the cooking pot 14 using convective heating, thereby air frying the food items in the basket 18. The vent hole 40 allows air to exhaust from the cooking pot 14 to the exterior of the cooking appliance 10 during air frying operation. Temperature within the cooking pot 14, as monitored by a temperature sensor and may be used by the control unit 19 to control operation of the cooking appliance 10, for example, by controlling the heating coil 44 and/or fan 43. The temperature detected by the temperature sensor may also be used to display cooking information on the control unit 19. During air frying operation, the cooktop 28 disposed on the base 12 remains off and is not used.

In broiler/browning oven mode, the base 12, cooking pot 14, and lid 16 are used. The power input port 46 and a control input port 47 of the lid 16, shown in FIG. 5, are connected to the power output port 72 and control output port 74 of the control unit 19, respectively, which allows the control unit 19 to be used to control operation of the fan 43 and heating coil 44 disposed in the lid 16. Food items to be broiled or browned are placed within the cooking pot 14. The cooking pot 14 is positioned on the cooktop 28 of the base 12, and the lid 16 is positioned on top of the cooking pot 14, with the lid locating feature 45 of the lid 16, shown in FIG. 5, engaging the complimentary lid locating feature 33 at the upper end 32 of the lid support post 30 of the base 12 to properly align the lid 16 relative to the base 12 and cooking pot 14. Like with air fryer mode, in broiler/browning mode, after the lid 16 is positioned on the cooking pot 14, the sliding lock actuator 39 is left in the unlocked position so that the vent hole 40 remains open and pressure buildup within the cooking pot 14 is prevented.

To commence broiling or browning, the user uses the control unit 19 to select a desired temperature setting for the heating coil 44, but leaves the fan 43 off. The heating coil 44 heats up to broil or brown the food items within the interior of the cooking pot 14. The vent hole 40 allows air to exhaust from the cooking pot 14 to the exterior of the cooking appliance 10 during operation to prevent pressure buildup within the cooking pot 14. Temperature within the cooking pot 14, as monitored by a temperature sensor and may be used by the control unit 19 to control operation of the cooking appliance 10, for example, by controlling the heating coil 44. The temperature detected by the temperature sensor may also be used to display cooking information on the control unit 19. During operation of the cooking appliance 10 in broiler/browning oven mode, the cooktop 28 disposed on the base 12 remains off and is not used.

The cooking appliance 10 according to the present disclosure advantageously provides a combination cooking appliance that may be quickly and easily configured/reconfigured to cook food items according to a variety of different cooking methods, including as a pressure cooker, an air fryer (i.e., convection oven), a sauté cooktop, and a broiler/browning oven. The cooking appliances 10 also advantageously include a safety lock systems that prevent the cooking pot 14 from being opened through removal of the lid 16 during operation as a pressure cooker.

Referring to FIGS. 24 through 28, the underside surface 100 of the lid 16 forms a solid, pressure barrier, except for the valve opening 60 and the safety lock opening 64 as described above, to facilitate a pressure cooking mode. The fan 43 is driven by a magnetic drive assembly 104 that includes an upper hub 105 and a lower hub 106 where one or both of said hubs is magnetized such that the upper hub 105 and the lower hub 106 are mutually attracted to each other and positioned directly across from each other on opposite sides of the surface 100 so that torque and rotational motion provided to the upper hub 105 causes resultant rotational motion to the lower hub 106. The lower hub 106 is in communication with the fan 43 to drive it rotationally. The upper hub 105 is driven by the output shaft 107 of the electric fan motor 108. The barrier provided by the underside surface 100 of the lid 16 protects the motor 108 and related drive components from moisture, heat and external substances.

Figure 29:
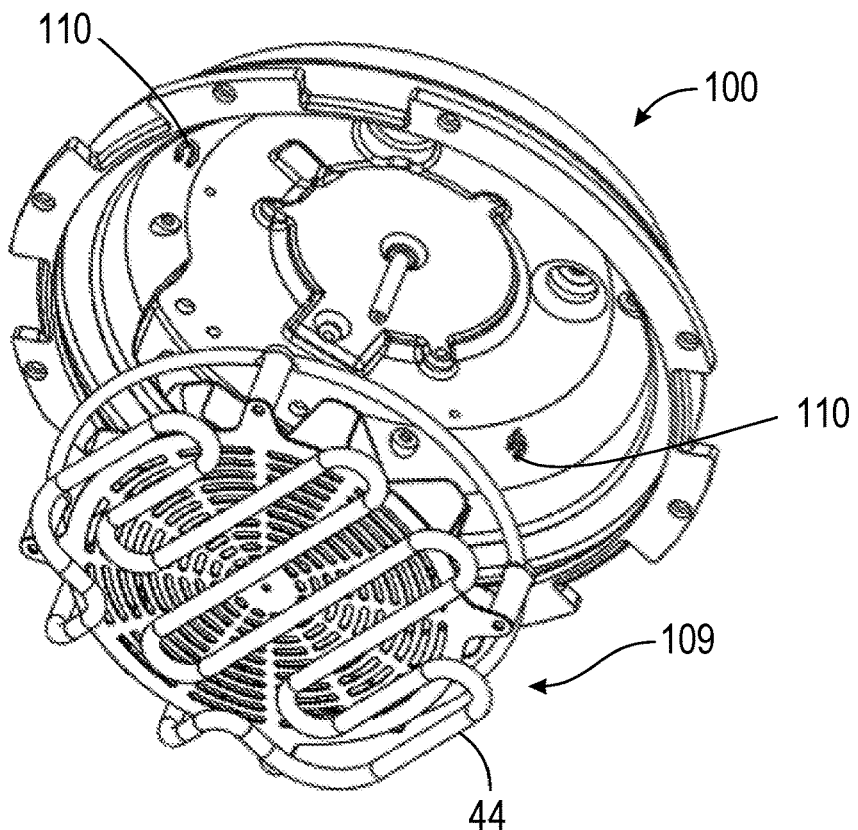
FIG. 29 is an exploded bottom perspective view of an inner cover and fan and heating assembly of the lid of FIG. 24.
Figure 30:
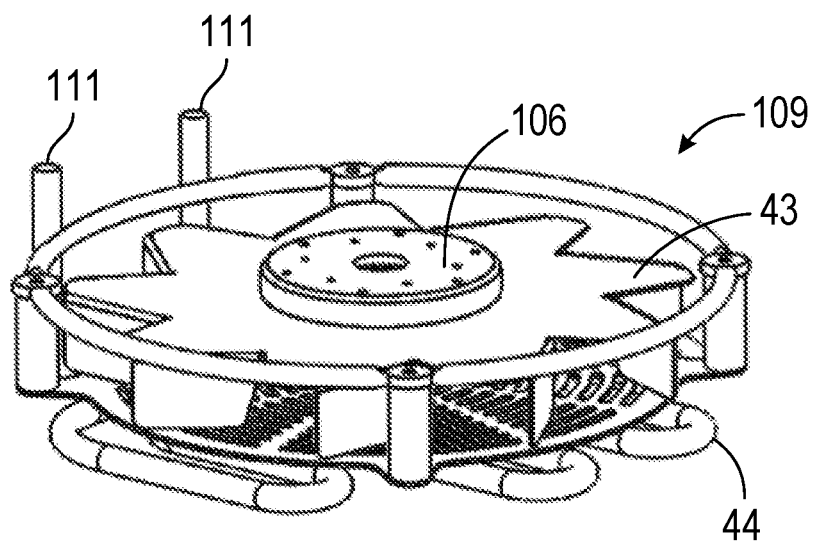
FIG. 30 is a top perspective view of the fan and heating assembly of FIG. 29.

Referring to FIGS. 29 and 30, the heater 42 and fan 43 may be removably attached together as a single heater and fan assembly 109 that is joined to the underside surface 100 of the lid 16 by one or more retention clips 110 or similar fasteners. Heater connectors 111 of a conventional type are provided in order to selectively connect and disconnect the heat coil 44 to electrically conductive components of a type generally known (not shown) in the lid 16. The lower hub 106 comprises part of the assembly 109 that is removable.

Figure 31:
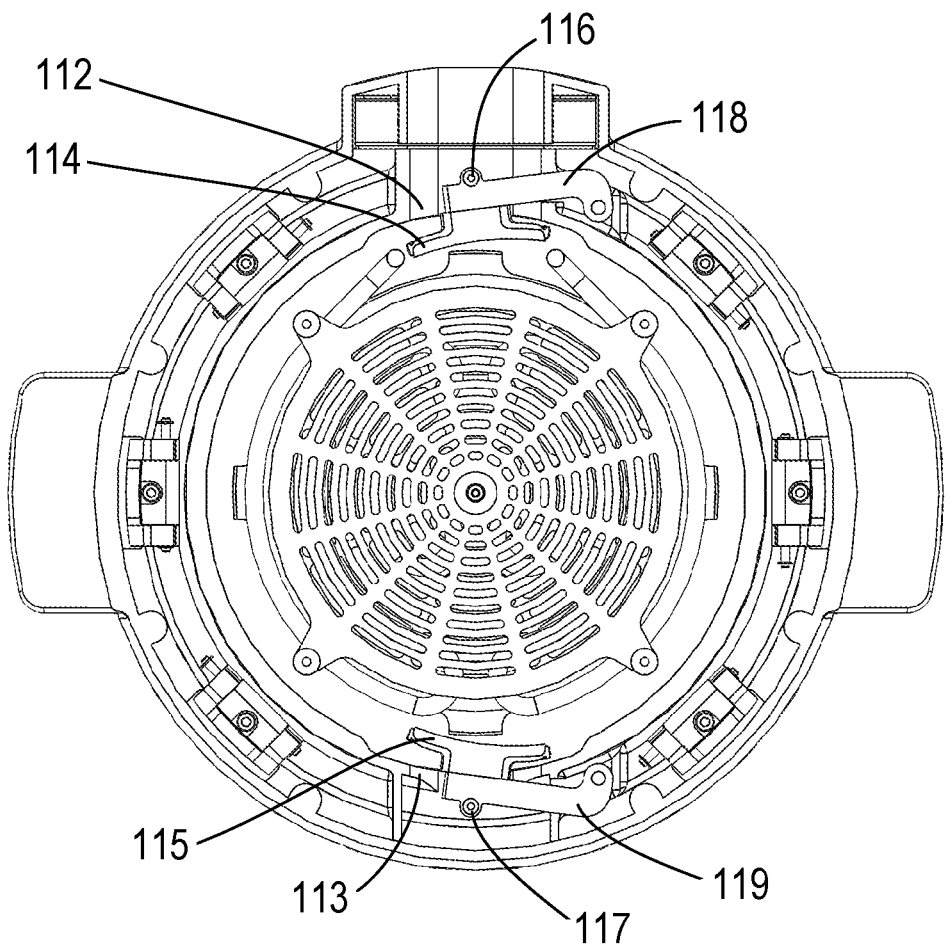
FIG. 31 is a bottom view of a lid of the cooking appliance of FIG. 1 with vents open according to an embodiment.
Figure 32:
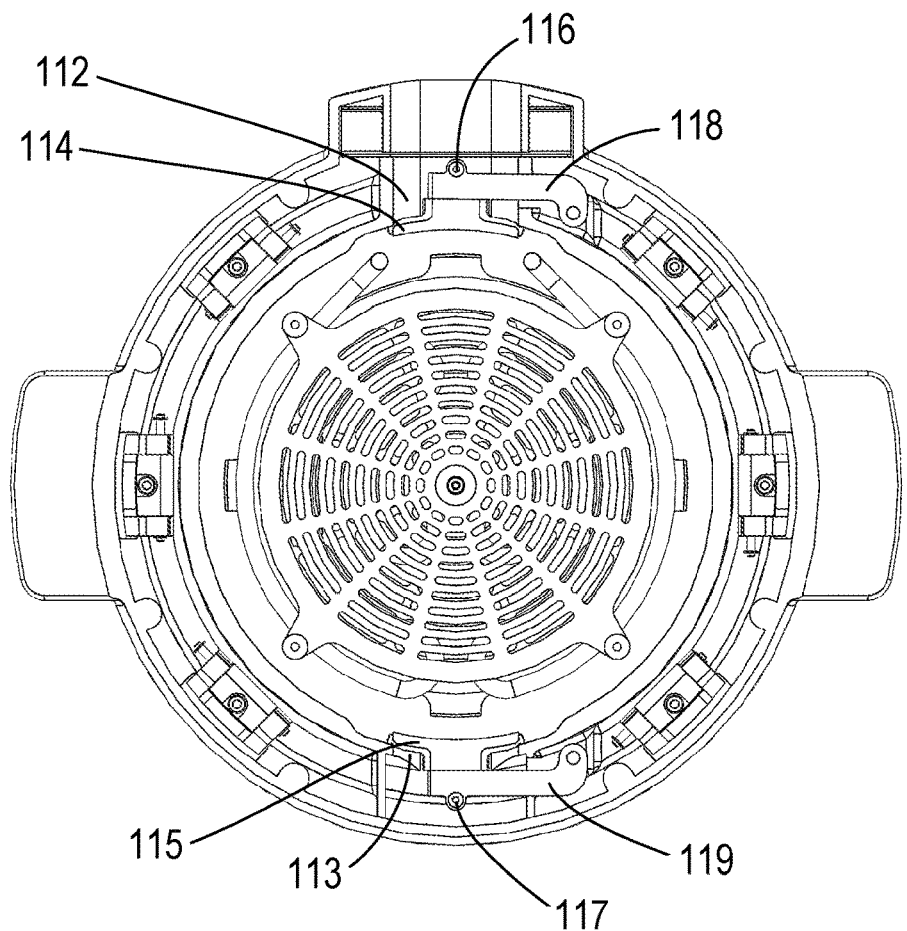
FIG. 32 is a bottom view of the lid of FIG. 31 with vents closed.

FIGS. 31 and 32 illustrate an alternative embodiment in which a plurality of vent openings 112 and 113 and a plurality of associated vent sealing members 114 and 115 are provided. In a manner similar to that described with respect to the above embodiment, the sealing members 114 and 115 are moved between opened positions (FIG. 31) and closed positions (FIG. 32) in response to movement of the lock ring 57 causing cam followers 116 and 117 associated with pivot arms 118 and 119 to facilitate such movement. As described above, closing the vent openings 112 and 113 is performed during pressure cooking mode.

While the principles of the present disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A cooking appliance comprising:
 a base including an upper surface having a cooktop with a first heater;
 a lid separable from the base, the lid including a plurality of vent openings adapted to be opened and closed and a heater assembly including a second heater disposed therein, wherein the heater assembly disposed in the lid includes a fan and the second heater is a heating coil;
 a cooking pot that is separable from the base and the lid, the cooking pot configured to sit on the cooktop of the base and to interface with the lid at an upper end in a selectively sealing manner such that when said vent openings are closed the interior of said cooking pot can be pressurized;
 a control unit configured to operate at least one of the first heater and the second heater;
 a lower lid surface associated with said lid;
 a fan motor having a drive shaft and drive hub located in said lid and above said lower lid surface; and
 a driven hub located below said lower lid surface and coupled to said fan, wherein one or both of said drive hub and said driven hub are magnetically charged so as to cause said driven hub to be coupled to said drive hub by magnetic force through the lower lid surface such that the driven hub and fan are rotationally driven when said drive hub rotates.

2. The cooking appliance according to claim 1, wherein the lid includes a locking system that secures the lid to the upper end of the cooking pot in a locked position.

3. The cooking appliance according to claim 2, wherein the locking system comprises:
 a plurality of engagement hooks extending downward from the lid; and
 an actuator configured to move the plurality of engagement hooks into and out of engagement with the cooking pot.

4. The cooking appliance according to claim 3, further comprising a safety lock assembly that prevents the lid from being removed from the cooking pot during operation of the cooking appliance in a pressure cooker mode by preventing the engagement hooks from disengaging the cooking pot when the interior of the cooking pot is pressurized.

5. The cooking appliance according to claim 1, wherein the lid comprises:
 one or more vent holes extending between an interior of the lid and an exterior of the lid; and
 one or more vent sealing members configured to close a respective one of said vent hole or said vent holes when moved to an actuated position and to open a respective one of said vent hole or said vent holes when moved to an unactuated position.

6. The cooking appliance according to claim 1, wherein the lid comprises:
 at least one vent hole extending between an interior of the lid and an exterior of the lid;
 at least one vent sealing member configured to close the vent hole when activated and to open the vent hole when deactivated;
 a locking system configured to secure the lid to the upper end of the cooking pot when activated and to release the lid from the upper end of the cooking pot when deactivated; and
 an actuator configured to simultaneously activate or deactivate the at least one vent sealing member and the locking system.

7. The cooking appliance according to claim 1, wherein the control unit comprises a plurality of different cooking modes controlling operation of the first heater, the second heater and the fan.

8. The cooking appliance according to claim 7, wherein the plurality of different cooking modes includes a pressure cooker mode; and
 wherein the lid includes a pressure release valve configured to control pressure within the cooking pot during operation in the pressure cooking mode.

9. The cooking appliance according to claim 1, wherein the first heater is an induction cooktop that provides conductive heating to the interior of the cooking pot and the second heater is a heating coil that provides convective heating to the hollow interior.

10. A cooking appliance comprising:
 a base including an upper surface having a cooktop including a first heater;
 a lid separable from the base, the lid including one or more vent openings and a heater assembly including a second heater disposed therein, wherein the heater assembly disposed in the lid includes a fan and the second heater is a heating coil;
 a cooking pot that is separable from the base and the lid, the cooking pot configured to sit on the cooktop of the base and to interface with the lid at an upper end in a selectively sealing manner such that when said vent openings are closed the interior of said cooking pot can be pressurized;
 a control unit configured to operate the cooking appliance in a plurality of different cooking modes by controlling at least one of the cooktop in the base or the heater assembly in the lid;
 a lower lid surface associated with said lid;
 a fan motor having a drive shaft and drive hub located in said lid and above said lower lid surface; and
 a driven hub located below said lower lid surface and coupled to said fan, wherein one or both of said drive hub and said driven hub are magnetically charged so as to cause said driven hub to be coupled to said drive hub by magnetic force through the lower lid surface such that the driven hub and fan are rotationally driven when said drive hub rotates.

11. The cooking appliance according to claim 10, wherein the plurality of different cooking modes includes a saut mode in which the lid and cooking pot are removed from the base and the control unit operates only the cooktop in the base such that any one of a plurality of cooking vessels may be utilized on said cooktop.

12. The cooking appliance according to claim 11, wherein the cooktop is an induction cooktop configured to provide convective heating.

13. The cooking appliance according to claim 10, wherein the plurality of different cooking modes includes a pressure cooker mode in which the cooking pot is disposed on the base, the lid is sealingly secured to the cooking pot and said one or more vents are closed, and the control unit operates the cooktop in the base.

14. The cooking appliance according to claim 13, wherein the cooktop is an induction cooktop configured to provide convective heating to an interior of the cooking pot.

15. The cooking appliance according to claim 10, wherein the plurality of different cooking modes includes a broiling and browning mode in which the cooking pot is disposed on the base, the lid is secured to the cooking pot, at least one vent opening is opened, and the control unit operates only the second heater.

16. The cooking appliance according to claim 10, further comprising a cooking basket configured to be disposed within the cooking pot.

17. The cooking appliance according to claim 16, wherein the plurality of different cooking modes includes an air fryer mode in which the cooking basket is disposed within the cooking pot, the cooking pot is disposed on the base, the lid is secured to the cooking pot, at least one vent opening is opened and the control unit operates both the fan and the second heater.

* * * * *

UNITED STATES PATENT AND TRADEMARK OFFICE
CERTIFICATE OF CORRECTION

PATENT NO. : 11,503,938 B2
APPLICATION NO. : 16/678404
DATED : November 22, 2022
INVENTOR(S) : Joseph W. Zakowski et al.

It is certified that error appears in the above-identified patent and that said Letters Patent is hereby corrected as shown below:

In the Claims

Column 12, Claim 11, Line 2, please remove "saut" and insert --sauté--.

Signed and Sealed this
Fourteenth Day of February, 2023

Katherine Kelly Vidal
*Director of the United States Patent and Trademark Office*